(12) United States Patent
Lee

(10) Patent No.: US 12,519,675 B2
(45) Date of Patent: Jan. 6, 2026

(54) METHOD AND SYSTEM FOR CONTROLLING HOME APPLIANCE

(71) Applicant: SAMSUNG ELECTRONICS CO., LTD., Suwon-si (KR)

(72) Inventor: Kunyoung Lee, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 0 days.

(21) Appl. No.: 18/406,362

(22) Filed: Jan. 8, 2024

(65) Prior Publication Data

US 2024/0146572 A1  May 2, 2024

Related U.S. Application Data

(63) Continuation of application No. PCT/KR2022/009693, filed on Jul. 5, 2022.

(30) Foreign Application Priority Data

Jul. 8, 2021  (KR) .................. 10-2021-0089945

(51) Int. Cl.
*H04L 12/28* (2006.01)
*G06F 3/04817* (2022.01)

(52) U.S. Cl.
CPC ........ *H04L 12/2832* (2013.01); *H04L 12/282* (2013.01)

(58) Field of Classification Search
CPC . H04L 12/2832; H04L 12/282; H04L 12/283; H04L 2012/2841; H04L 2012/285;

(Continued)

(56) References Cited

U.S. PATENT DOCUMENTS 7,873,699 B2   1/2011  Ha et al.
8,612,555 B2  12/2013  Park
(Continued)

FOREIGN PATENT DOCUMENTS

JP   6976126 B2  12/2021
JP   7210300 B2   1/2023
(Continued)

OTHER PUBLICATIONS

Sathia Narayanan Mahadevan, 'Achieving connected home architectural simplicity', 2011 IEEE International Games Innovation Conference (IGIC), Dec. 29, 2011.
(Continued)

*Primary Examiner* — Kamal M Hossain
(74) *Attorney, Agent, or Firm* — CANTOR COLBURN LLP

(57) ABSTRACT

Provided is a method by which a server device controls a home appliance. The method includes: storing in the server device a first instruction packet of a first group device connected to a home network hub device and controlled by the first instruction packet broadcast from the home network hub device; identifying, based on a first scenario, the first instruction packet for controlling an operation of the first group device and a second instruction packet for controlling an operation of a second group device; and transmitting the first instruction packet to a relay device connected to the home network hub device and transmitting the second instruction packet to the second group device.

12 Claims, 19 Drawing Sheets

(58) Field of Classification Search
CPC ............. H04L 12/2818; H04L 12/2823; G06F 3/04817
See application file for complete search history.

(56) References Cited

U.S. PATENT DOCUMENTS

| | | |
|---|---|---|
| 9,933,768 B2 | 4/2018 | Britt et al. |
| 10,020,957 B2 | 7/2018 | Kim et al. |
| 10,833,888 B2 | 11/2020 | Kim et al. |
| 11,540,245 B2 | 12/2022 | Lee |
| 2015/0140990 A1* | 5/2015 | Kim ................. H04W 8/186 455/418 |
| 2017/0195318 A1 | 7/2017 | Liu et al. |
| 2019/0132396 A1* | 5/2019 | Finnegan ............ H04L 12/2818 |
| 2020/0025401 A1* | 1/2020 | Cheon ................... G05B 15/02 |
| 2020/0059976 A1 | 2/2020 | Bhatia et al. |

FOREIGN PATENT DOCUMENTS

| | | |
|---|---|---|
| KR | 100434270 B1 | 6/2004 |
| KR | 100541942 B1 | 1/2006 |
| KR | 100997892 B1 | 12/2010 |
| KR | 101738784 B1 | 5/2017 |
| KR | 20190013964 A | 2/2019 |
| KR | 20190043693 A | 4/2019 |
| KR | 20190074669 A | 6/2019 |
| KR | 102068987 B1 | 1/2020 |
| KR | 102202660 B1 | 1/2021 |
| KR | 20210026834 A | 3/2021 |
| KR | 102252258 B1 | 5/2021 |
| KR | 20210082005 A | 7/2021 |

OTHER PUBLICATIONS

International Search Report mailed Oct. 4, 2022 for PCT/KR2022/009693, citing the above reference(s).

* cited by examiner

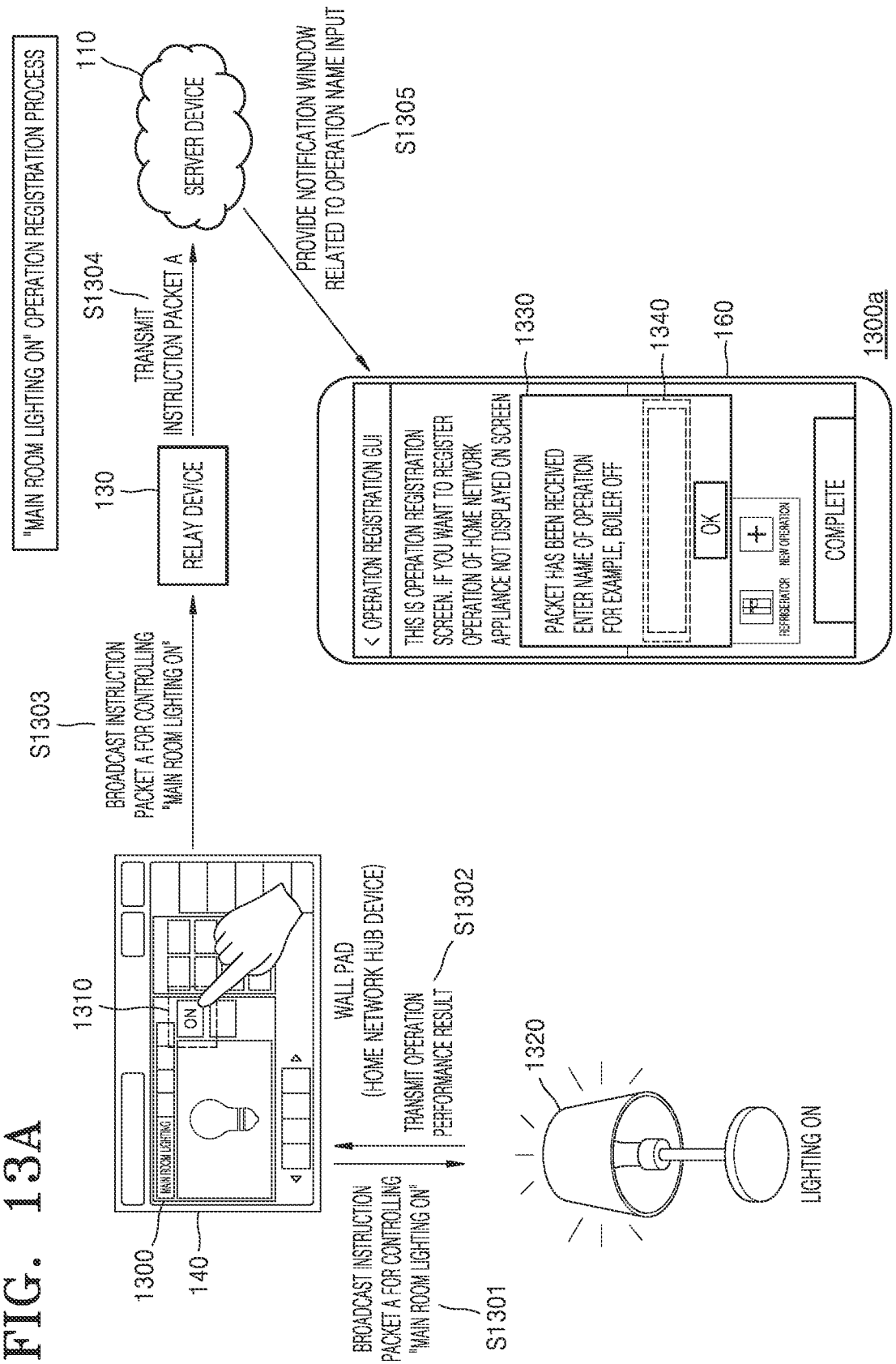

METHOD AND SYSTEM FOR CONTROLLING HOME APPLIANCE

CROSS-REFERENCE TO RELATED APPLICATIONS

This application is a continuation application, claiming priority under § 365(c), of an International application No. PCT/KR2022/009693, filed on Jul. 5, 2022, which is based on and claims the benefit of a Korean patent application number 10-2021-0089945, filed on Jul. 8, 2021, in the Korean Intellectual Property Office, the disclosure of each of which is incorporated by reference herein in its entirety.

TECHNICAL FIELD

Embodiments of the present disclosure relate to a method and system for controlling an indoor home appliance based on a scenario generated by using environment information obtained through a sensor of the home appliance.

BACKGROUND ART

The Internet of Things (IoT) is the next-generation Internet and the basic technology/service of the hyper-connected society. The IoT is defined as the Internet between things or the Internet between objects (Internet of Objects) and refers to an environment in which information generated by uniquely identifiable things is shared through the Internet.

Internet-connected devices (IoT devices) collect data by using built-in sensors and react accordingly depending on circumstances. IoT devices are useful for improving ways of working and living. IoT devices have been applied in various fields from smart home devices that automatically adjust heating and lighting to smart factories that monitor industrial equipment, find problems thereof, and then automatically solve the problems.

In particular, recently, household appliance products have shown a tendency to pursue a combination with IoT in order to enhance hygiene-related functions. As a humidifier, a dehumidifier, an air cleaner, an air circulator, and the like are combined with the IoT function, the indoor environment is automatically optimized by analyzing whether a user is currently indoors, indoor and outdoor fine dust levels, and the like.

In the case of a device pre-connected to a server, a control command for controlling the device is stored in the server, but in the case of a home network IoT device not connected to a server, a control command is not stored in the server. Thus, in the case of a home network IoT device not connected to a server, there is a limitation in that it is difficult to control externally through the server.

SUMMARY

According to various embodiments of the present disclosure, a method by which a server device controls a home appliance and a system for controlling a home appliance may be provided. Particularly, according to an embodiment of the present disclosure, a method and system for controlling an indoor home appliance based on a scenario generated by using environment information obtained through a sensor of the indoor home appliance may be provided. According to another embodiment of the present disclosure, a method and system for registering a control command of an indoor home appliance, which is not registered in a server device, in the server device may be provided.

According to an embodiment of the present disclosure, a method by which a server device controls a home appliance may include: storing in the server device a first instruction packet of a first group device connected to a home network hub device and controlled by the first instruction packet broadcast from the home network hub device; identifying, based on a first scenario, the first instruction packet for controlling an operation of the first group device and a second instruction packet for controlling an operation of a second group device; and transmitting the first instruction packet to a relay device connected to the home network hub device and transmitting the second instruction packet to the second group device.

According to an embodiment of the present disclosure, the storing of the first instruction packet of the first group device may include providing, to an electronic device communicating with the server device, an operation registration graphical user interface (GUI) for registering an operation of the first group device; receiving the first instruction packet for controlling an operation of the first group device, through the relay device, based on an operation registration request obtained through the operation registration GUI; and matching the received first instruction packet and the operation of the first group device and storing the matched information in a lookup table of the server device, where the first instruction packet received through the relay device may be broadcast from the home network hub device to the relay device.

According to an embodiment of the present disclosure, the method may include obtaining at least one piece of environment information from a first group device or a second group device; providing, to the electronic device, a plurality of recommended scenarios in which the obtained at least one piece of environment information is matched to at least one operation of at least one of the first group device and the second group device; and adding the second scenario to a scenario list based on receiving an input for selecting a second scenario related to second environment information from among a plurality of recommended scenarios through the electronic device.

According to an embodiment of the present disclosure, a server device may include: a communication interface configured to communicate with at least one home appliance; a memory storing one or more instructions; and at least one processor connected to the memory, wherein the at least one processor may be configured to perform, by executing the one or more instructions, an operation of storing a first instruction packet of a first group device connected to a home network hub device and controlled by the first instruction packet broadcast from the home network hub device; an operation of identifying, based on first environment information obtained from the first group device or a second group device, a first scenario corresponding to the first environment information among a scenario list defining at least one operation of at least one of the first group device and the second group device; an operation of identifying, based on the first scenario, the first instruction packet for controlling an operation of the first group device and a second instruction packet for controlling an operation of the second group device; and an operation of transmitting the first instruction packet to a relay device connected to the home network hub device and transmitting the second instruction packet to the second group device, wherein the least one home appliance includes the second group device and the relay device.

According to an embodiment of the present disclosure, a relay device may include: a first standard communication circuit configured to communicate with a home network hub device; a second standard communication circuit configured to communicate with a server device; a memory storing one or more instructions; and at least one processor connected to the memory, wherein the at least one processor may be configured to perform, by executing the one or more instructions, an operation of receiving a first instruction packet for controlling an operation of a first group device from the server device through the second standard communication circuit; and an operation of transmitting the received first instruction packet from the server device to the home network hub device through the first standard communication circuit.

According to an embodiment of the present disclosure, a computer-readable recording medium may have recorded thereon a program causing a server device to perform an operation of storing a first instruction packet of a first group device connected to a home network hub device and controlled by the first instruction packet broadcast from the home network hub device; an operation of identifying, based on first environment information obtained from the first group device or a second group device, a first scenario corresponding to the first environment information among a scenario list defining at least one operation of at least one of the first group device and the second group device; an operation of identifying, based on the first scenario, the first instruction packet for controlling an operation of the first group device and a second instruction packet for controlling an operation of the second group device; and an operation of transmitting the first instruction packet to a relay device connected to the home network hub device and transmitting the second instruction packet to the second group device.

DESCRIPTION OF DRAWINGS

FIGS. 13A and 13B are diagrams for describing an operation of a server device storing an instruction packet of a first group device, according to an embodiment of the present disclosure.

MODE FOR INVENTION

Figure 1:
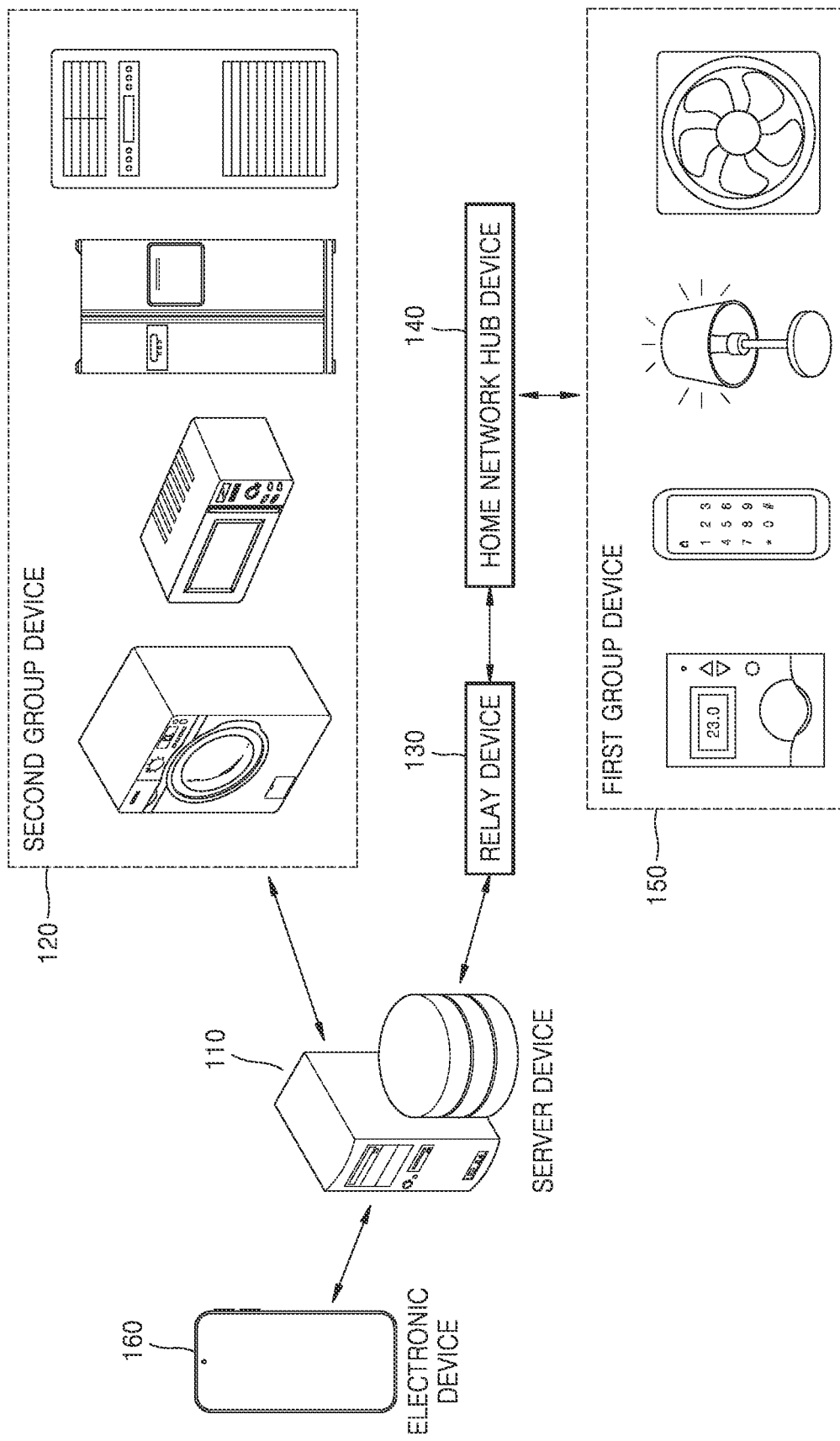
FIG. 1 is a diagram for describing a system for controlling a home appliance, according to an embodiment of the present disclosure.

Terms used herein will be briefly described and then embodiments of the present disclosure will be described in detail.

The terms used herein are those general terms currently widely used in the art in consideration of functions in embodiments of the present disclosure, but the terms may vary according to the intentions of those of ordinary skill in the art, precedents, or new technology in the art. Also, in some cases, there may be terms that are optionally selected by the applicant, and the meanings thereof will be described in detail in the corresponding embodiment of the present disclosure. Thus, the terms used herein should be understood not as simple names but based on the meanings of the terms and the overall description of the present disclosure.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Throughout the present disclosure, when something is referred to as "including" an element, one or more other elements may be further included unless specified otherwise. Also, as used herein, the terms such as "units" and "modules" may refer to units that perform at least one function or operation, and the units may be implemented as hardware or software or a combination of hardware and software.

Hereinafter, embodiments of the present disclosure will be described in detail with reference to the accompanying drawings so that those of ordinary skill in the art may easily implement the present disclosure. However, the present disclosure may be embodied in many different forms and should not be construed as being limited to the embodiments set forth herein. Also, portions irrelevant to the description of the present disclosure will be omitted in the drawings for a clear description of embodiments of the present disclosure, and like reference numerals will denote like elements throughout the present disclosure.

FIG. 1 is a diagram for describing a system for controlling a home appliance, according to an embodiment of the present disclosure.

Referring to FIG. 1, a system for controlling a home appliance according to an embodiment of the present disclosure (hereinafter referred to as a home appliance control system) may include a server device 110, a second group device 120, a relay device 130, a home network hub device 140, a first group device 150, and an electronic device 160. However, not all of the illustrated components are essential components. The home appliance control system may include more components than the illustrated components or may include fewer components than the illustrated components. Each configuration thereof will be described below.

The second group device 120 according to an embodiment of the present disclosure may be a home appliance directly connected to the server device 110. The second group device 120 according to an embodiment of the present disclosure may be a home appliance registered in the account of the server device 110. Identification information of the second group device 120 according to an embodiment of the present disclosure may be stored in the server device 110, and the server device 110 may identify each home appliance corresponding to the second group device 120 based on the stored identification information.

The second group device 120 according to an embodiment of the present disclosure may be a home appliance capable of directly communicating with the server device 110. The second group device 120 according to an embodiment of the present disclosure may directly receive a control signal and data from the server device 110, designate the server device 110 as a destination, and directly transmit the control signal and data to the server device 110. A control command packet corresponding to a control signal for controlling the second group device 120 according to an embodiment of the present disclosure may be already stored in the server device 110.

According to an embodiment of the present disclosure, the second group device 120 may include a refrigerator, an air cleaner, an air conditioner, an audio device, a washing machine, a dryer, a clothing care machine, a TV, a dishwasher, an oven, a microwave oven, an air fryer, a water purifier, and the like; however, the present disclosure is not limited thereto.

The second group device 120 according to an embodiment of the present disclosure may include a communication interface for communicating with an external device. For example, the second group device 120 may communicate with the server device 110 or the electronic device 160 through the communication interface. The communication interface may include a short-range wireless communication interface, a mobile communication interface, and/or the like. The short-range wireless communication interface may include, but is not limited to, a Bluetooth communication interface, a Bluetooth Low Energy (BLE) communication interface, a Near Field Communication interface, a WLAN (WiFi) communication interface, a ZigBee communication interface, an Infrared Data Association (IrDA) communication interface, a WiFi Direct (WFD) communication interface, an Ultra-Wideband (UWB) communication interface, and/or an Ant+ communication interface.

The first group device 150 according to an embodiment of the present disclosure may be a home appliance that is not directly connected to the server device 110. The first group device 150 according to an embodiment of the present disclosure may be a home appliance that is not registered in the account of the server device 110. According to an embodiment of the present disclosure, the first group device 150 may not be capable of directly communicating with the server device 110 because it does not include long-distance communication.

The first group device 150 according to an embodiment of the present disclosure may correspond to a home network IoT device and thus may be connected to the home network hub device 140. The user may control an operation of the first group device 150 by operating the home network hub device 140. The first group device 150 may receive an instruction packet broadcast from the home network hub device 140. When the home network hub device 140 broadcasts an instruction packet, all of the first group devices 150 connected to the home network hub device 140 may receive the broadcast instruction packet. When the broadcast instruction packet is received, the first group device 150 corresponding to the instruction packet among the first group devices 150 may perform an operation corresponding to the instruction packet. Among the first group devices 150, the other devices not corresponding to the received instruction packet may not execute the received instruction packet.

According to an embodiment of the present disclosure, the first group device 150 may include a boiler, an induction range, a lighting device, a door lock, an indoor ventilation system, a system air conditioner, a gas control device, a crime prevention device, an elevator, and the like; however, the present disclosure is not limited thereto.

In this case, in a general home network system, because the home network IoT device corresponding to the first group device 150 is not connected to the server device 110, there may be a problem in that a scenario may not be generated by combining the first group device 150 with the second group device 120. When an instruction packet for controlling an operation of the first group device 150 may be stored in the server device 110, because the server device 110 may control both the first group device 150 and the second group device 120, a scenario may be generated by combining the first group device 150 with the second group device 120. Thus, according to an embodiment of the present disclosure, the relay device 130 relaying between the server device 110 and the home network hub device 140 connected to the first group device 150 may be proposed to transmit an instruction packet for controlling an operation of the first group device 150 to the server device 110.

The first group device 150 according to an embodiment of the present disclosure may not be directly connected to the server device 110 but may be indirectly connected to the server device 110 through the relay device 130 connected to the home network hub device 140.

A control command packet for controlling the first group device 150 according to an embodiment of the present disclosure may not be stored in the server device 110.

In this case, the electronic device 160 may provide guide information for registering a control instruction packet of the first group device 150, to the user through an operation registration graphical user interface (GUI). When the user controls an operation of the first group device 150 through the home network hub device 140 according to the guide information, the home network hub device 140 may broadcast an instruction packet for controlling an operation of the first group device 150. The relay device 130 according to an embodiment of the present disclosure may receive the instruction packet broadcast from the home network hub device 140 and may transmit the received instruction packet to the server device 110. When receiving the instruction packet from the relay device 130, the server device 110 may generate a notification window for receiving an input of a name related to the operation of the instruction packet and then provide the same to the electronic device 160. When the user inputs the name related to the operation of the instruction packet through an operation name notification window displayed on the electronic device 160, the server device 110 may match and store the input name and the instruction packet in a lookup table. An embodiment of registering an operation of the first group device 150 in the server device 110 will be described with reference to FIGS. 10 to 13B.

According to an embodiment of the present disclosure, the first group device 150 and the second group device 120 may transmit environment information (e.g., temperature value, humidity value, and/or the like) to the server device 110. The first group device 150 and the second group device 120 may periodically transmit the environment information to the server device 110 or may transmit the environment information to the server device 110 when a particular event has occurred.

According to an embodiment of the present disclosure, a scenario in which an operation of the first group device 150 or the second group device 120 is matched to the environment information received from the first group device 150 or the second group device 120 may be set. An operation of setting a scenario in which an operation of the first group device 150 or the second group device 120 is matched to the environment information will be described below in detail with reference to FIG. 16.

The server device 110 according to an embodiment of the present disclosure may include an AI processor. By training an artificial neural network, the AI processor may generate an artificial intelligence model for providing a recommended scenario based on the environment information obtained from the first group device 150 or the second group device 120. "Training" the artificial neural network may mean generating a mathematical model for allowing the neurons of the artificial neural network to make an optimal decision while suitably changing weights based on data.

According to an embodiment of the present disclosure, the server device 110 may include a communication interface for communicating with an external device. For example, the server device 110 may communicate with the second group device 120, the relay device 130, and the electronic device 160.

According to an embodiment of the present disclosure, the server device 110 may collect information of the first group device 150 or the second group device 120. The server device 110 may receive environment information collected from the first group device 150 or the second group device 120. The server device 110 may receive the environment information from the first group device 150 or the second group device 120 periodically or when a particular event has occurred. In this case, the server device 110 may receive the environment information collected from the first group device 150, through the relay device 130 connected to the home network hub device 140 controlling the first group device 150.

The electronic device 160 according to an embodiment of the present disclosure may be connected to the server device 110 to display information provided by the server device 110. According to an embodiment of the present disclosure, the electronic device 160 may transmit/receive information to/from the server device 110 through a particular application installed in the electronic device 160. According to an embodiment of the present disclosure, the particular application may provide a function for allowing the user to register an operation of the first group device 150 in the server device 110 or to remotely control the first group device 150 or the second group device 120.

The electronic device 160 according to an embodiment of the present disclosure may be implemented in various forms. For example, the electronic device 160 described in the present disclosure may include a mobile terminal, a refrigerator including a display, a TV, a computer, or an oven including a display; however, the present disclosure is not limited thereto. Also, the mobile terminal may include a smart phone, a notebook computer (laptop computer), a tablet PC, a digital camera, an e-book terminal, a digital broadcasting terminal, a personal digital assistant (PDA), a portable multimedia player (PMP), a navigation device, or an MP3 player; however, the present disclosure is not limited thereto. For example, the mobile terminal may be a wearable device that may be worn by the user. The wearable device may include at least one of an accessory-type device (e.g., a watch, a ring, a wristlet, an anklet, a necklace, glasses, or a contact lens), a head-mounted-device (HMD), a cloth or clothing-integrated device (e.g., electronic clothing), a body-attachable device (e.g., a skin pad), or a bio-implantable device (e.g., an implantable circuit). Hereinafter, for convenience of description, a case where the electronic device 160 is a smart phone will be described as an example.

Figure 2:
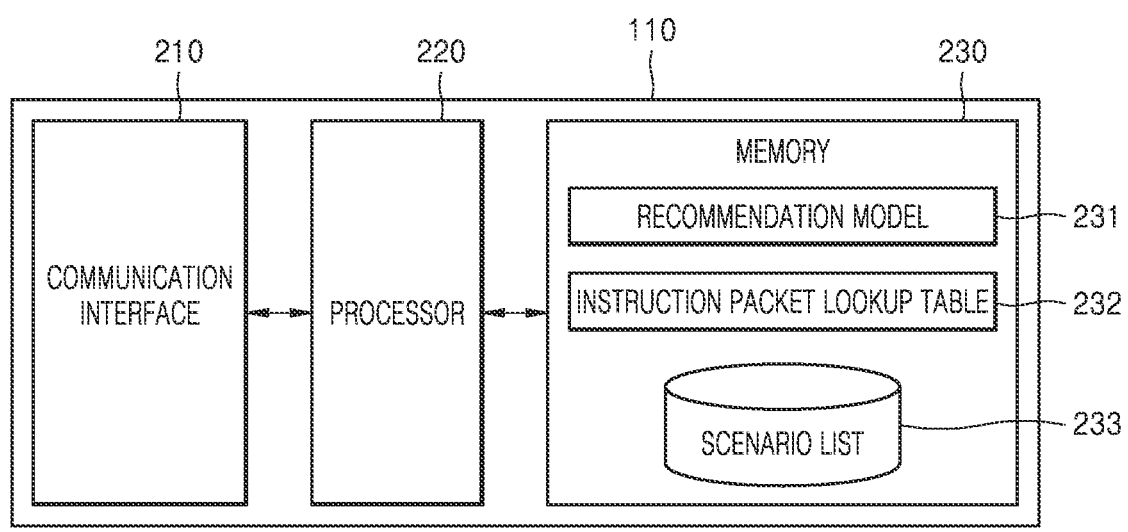
FIG. 2 is a block diagram for describing a function of a server device according to an embodiment of the present disclosure.

FIG. 2 is a block diagram for describing a function of a server device according to an embodiment of the present disclosure.

Referring to FIG. 2, the server device 110 may include a communication interface 210, a processor 220, and a memory 230. However, not all of the illustrated components are essential components. The server device 110 may include more components than the illustrated components or may include fewer components than the illustrated components.

Hereinafter, the above components will be described in sequence.

The communication interface 210 may include one or more component for allowing communication between the server device 110 and the second group device 120, between the server device 110 and the relay device 130, or between the server device 110 and the electronic device 160.

According to an embodiment of the present disclosure, the communication interface 210 may receive a first instruction packet for controlling the first group device 150 through the relay device 130. The communication interface 210 may receive a first instruction packet for controlling the first group device 150 through the relay device 130 connected to the home network hub device 140. Here, the first group device 150 may be one of the home appliances not connected to the server device 110.

According to an embodiment of the present disclosure, the communication interface 210 may receive environment information through the first group device 150 or the second group device 120. Here, the environment information may be information obtained through a sensor included in the first group device 150 or the second group device 120 and may include fine dust information, temperature information, humidity information, noise information, and/or illuminance information; however, the present disclosure is not limited thereto.

According to an embodiment of the present disclosure, the communication interface 210 may transmit a first instruction packet to the relay device 130 connected to the home network hub device 140. The first instruction packet may include a control command for controlling an operation of the first group device 150. For example, the control command may include a command for turning on or off the first group device 150.

According to an embodiment of the present disclosure, the communication interface 210 may transmit a second instruction packet to the second group device 120. The second instruction packet may include a control command for controlling an operation of the second group device 120. For example, the control command may include a command for turning on or off the second group device 120.

The processor 220 may control an overall operation of the server device 110 by using a program, instructions, or information stored in the memory 230. The processor 220 may include one or more processors. Also, the processor 220 may control the operations of components included in the server device 110.

According to an embodiment of the present disclosure, based on first environment information obtained from the first group device 150 or the second group device 120, the processor 220 may identify a first scenario corresponding to the first environment information among a scenario list 233. Based on the first scenario, the processor 220 may identify a first instruction packet for controlling an operation of the first group device 150 and a second instruction packet for controlling an operation of the second group device 120. The processor 220 may transmit the identified first instruction packet to the relay device 130 through the communication interface 210 and may transmit the identified second instruction packet to the second group device 120 through the communication interface 210.

According to an embodiment of the present disclosure, the processor 220 may obtain at least one piece of environment information from a sensor included in the first group device 150 or the second group device 120. The processor 220 may provide a plurality of recommended scenarios in which the obtained at least one piece of environment information is matched to an operation of at least one of the first group device 150 or the second group device 120, to the user through the electronic device 160.

According to an embodiment of the present disclosure, the processor 220 may generate a plurality of recommended scenarios by using a recommendation model 231 corresponding to the artificial intelligence model in the memory 230. In this case, the processor 220 may provide a plurality of recommended scenarios to the user through an application of the electronic device 160. The recommended scenario according to an embodiment of the present disclosure may include a series of scenarios in which an operation of the first group device 150 or the second group device 120 is performed when a condition for the environment information is satisfied.

According to an embodiment of the present disclosure, the processor 220 may receive an input for selecting a second scenario related to second environment information among a plurality of recommended scenarios through the electronic device 160 and may add the selected second scenario to the scenario list 233. Here, the second scenario may be a scenario selected by the user among the plurality of recommended scenarios generated by the processor 220.

According to an embodiment of the present disclosure, the processor 220 may provide, to the electronic device 160, a scenario setting GUI including an environment information list, a list of first group devices 150 as control target devices to be controlled, a list of second group devices 120, and/or an operation list. Through the scenario setting GUI, the processor 220 may select third environment information from the environment information list and may receive an input related to an operation of the first group device 150 or the second group device 120 performed when the third environment information is satisfied. The processor 220 may generate a third scenario by combining the received third environment information and the operation of the first group device 150 or the second group device 120. In this case, the processor 220 may add the third scenario to the scenario list 233. Here, the third scenario may be a scenario directly set by the user through the scenario setting GUI provided by the processor 220.

The memory 230 may store a program for processing by the processor 220 or may store input/output data. For example, the memory 230 may store a recommendation model 231, an instruction packet lookup table 232, and a scenario list 233.

The recommendation model 231 may be an artificial intelligence model for generating a recommended scenario. The recommendation model 231 may generate a plurality of recommended scenarios by using at least one piece of environment information. For example, the recommendation model 231 may generate a plurality of recommended scenarios by matching at least one piece of environment information to an operation of the home appliance.

The recommendation model 231 may generate a recommended scenario by considering the user's utilization. For example, the recommendation model 231 may generate a recommended scenario based on information about the number of times the user uses the home appliance, context information of the user collected from the user's mobile terminal (e.g., information about the space where the user mainly stays), information about the scenarios selected by other users, and/or the like.

The instruction packet lookup table 232 may be information stored by matching the instruction packets capable of controlling the first group devices 150 not connected to the server device 110 to the operation name input from the user.

The scenario list 233 may include at least one scenario in which at least one piece of environment information is matched to at least one operation of the first group device 150 or the second group device 120. The scenario list 233 may include a scenario pre-approved by the user. For example, the scenario list 233 may include a scenario selected by the user among the scenarios recommended by the server device 110 and may include a scenario directly set by the user.

Figure 3:
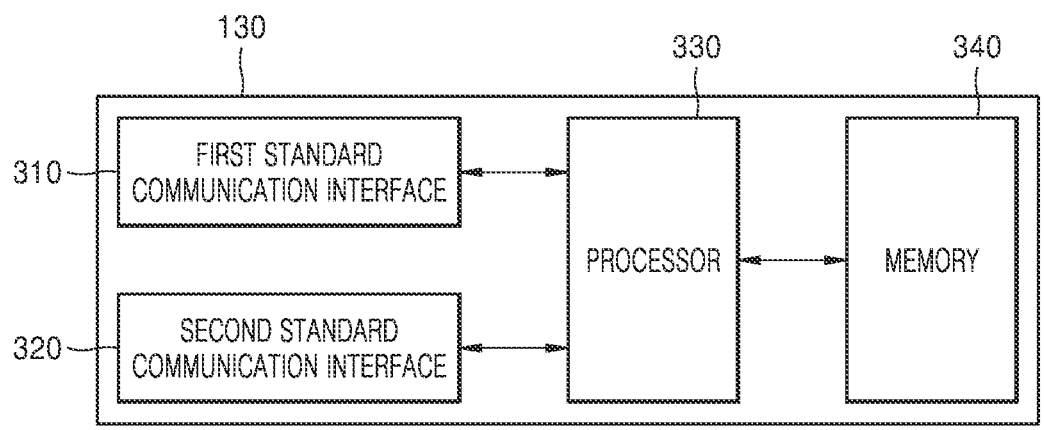
FIG. 3 is a block diagram for describing a function of a relay device according to an embodiment of the present disclosure.

FIG. 3 is a block diagram for describing a function of a relay device according to an embodiment of the present disclosure.

Referring to FIG. 3, the relay device 130 may include a first standard communication interface 310, a second standard communication interface 320, a processor 330, and a memory 340. However, not all of the illustrated components are essential components. The relay device 130 may include more component than the illustrated components or may include fewer components than the illustrated components.

Hereinafter, the above components will be described in sequence.

The first standard communication interface 310 may include one or more components for allowing communication between the relay device 130 and the home network hub device 140.

According to an embodiment of the present disclosure, the first standard communication interface 310 may include one or more components for allowing serial communication. The serial communication may refer to communication in which data is continuously transmitted in units of one bit at a time through a communication channel or bus. The serial communication may include RS 232 communication, RS 422 communication, RS 485 communication, Ethernet, IEEE 1394, Fiber Channel, Infini Band, and the like; however, the present disclosure is not limited thereto.

The second standard communication interface 320 may include one or more components for allowing communication between the relay device 130 and the server device 110.

According to an embodiment of the present disclosure, the second standard communication interface 320 may include a wireless communication module (e.g., a cellular communication module, a short-range wireless communication module, or a global navigation satellite system (GNSS) communication module) or a wired communication module (e.g., a local area network (LAN) communication module or a power line communication module). It may include a short-range wireless communication interface or a long-range wireless communication interface; however, the present disclosure is not limited thereto.

The short-range wireless communication interface may include, but is not limited to, a Bluetooth communication interface, a Bluetooth Low Energy (BLE) communication interface, a Near Field Communication interface, a WLAN (WiFi) communication interface, a ZigBee communication interface, an Infrared Data Association (IrDA) communication interface, a WiFi Direct (WFD) communication interface, an Ultra-Wideband (UWB) communication interface, an Ant+ communication interface, and/or a microwave (μ Wave) communication interface.

The long-range wireless communication interface may communicate with an external device through, for example, a legacy cellular network, a 5G network, a next-generation communication network, the Internet, or a computer network (e.g., LAN or WAN). The mobile communication interface may transmit/receive wireless signals to/from at least one of a base station, an external terminal, or a server on a mobile communication network. Here, the wireless signals may include voice signals, video call signals, or various types of data according to transmission/reception of text/multimedia messages.

The processor 330 may control an overall operation of the relay device 130 by using a program or information stored in the memory 340.

According to an embodiment of the present disclosure, the processor 330 may receive a first instruction packet for controlling an operation of the first group device 150, from the server device 110 through the second standard communication interface 320. The processor 330 may transmit the received first instruction packet to the home network hub device 140 through the first standard communication interface 310.

According to an embodiment of the present disclosure, when registering the first instruction packet in the server device 110, the processor 330 may receive the first instruction packet broadcast from the home network hub device 140, through the first standard communication interface 310. The processor 330 may transmit the received first instruction packet to the server device 110 through the second standard communication interface 320.

The memory 340 may store programs for processing and control by the processor 330 and may store input/output data (e.g., the first instruction packet, the environment information, and the like). The memory 340 may store an artificial intelligence model.

The memory 340 may include at least one type of storage medium from among flash memory type, hard disk type, multimedia card micro type, card type memory (e.g., SD or XD memory), random access memory (RAM), static random access memory (SRAM), read only memory (ROM), electronically erasable programmable read only memory (EEPROM), programmable read only memory (PROM), magnetic memory, magnetic disk, and optical disk.

Figure 4:
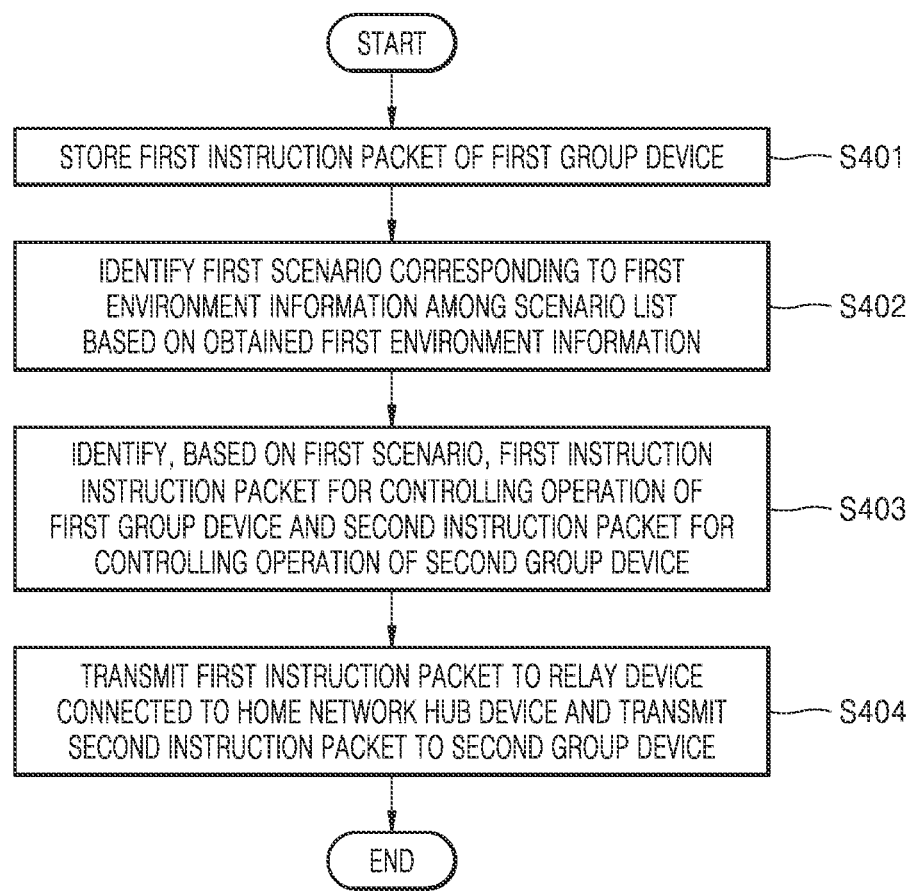
FIG. 4 is a flowchart for describing a method by which a server device controls a home appliance, according to an embodiment of the present disclosure.

FIG. 4 is a flowchart for describing a method by which a server device controls a home appliance, according to an embodiment of the present disclosure.

In operation S401, the server device 110 according to an embodiment of the present disclosure may store a first instruction packet for controlling the first group device 150. Because an instruction packet for controlling the first group device 150 according to an embodiment of the present disclosure is not stored in the server device 110, an operation of storing the first instruction packet for controlling the first group device 150 may be required to control the first group device 150 through the server device 110.

The server device 110 according to an embodiment of the present disclosure may generate an operation registration GUI for registering the first instruction packet for controlling the first group device 150 and provide the operation registration GUI to the electronic device 160. The electronic device 160 according to an embodiment of the present disclosure may receive an operation registration request from the user through the operation registration GUI and transmit the operation registration request to the server device 110. The server device 110 having received the operation registration request may provide guide information including an operation method for registering an operation of the first group device 150, to the user.

According to the guide information, the user may operate the first group device 150 through the home network hub device 140 to which the first group device 150 is connected. According to an embodiment of the present disclosure, a first instruction packet capable of controlling an operation of the first group device 150 may be broadcast from the home network hub device 140 to the first group device 150. For example, when the user selects an operation of turning on the living room lighting that is the first group device 150 through the home network hub device 140 (e.g., wall pad), an instruction packet for turning on the living room lighting may be broadcast from the home network hub device 140 to the first group device 150. In this case, the instruction packet for turning on the living room lighting may be broadcast to all of the first group devices 150, but only the living room lighting among the first group devices 150 may respond to the instruction packet and the living room lighting may perform an operation of turning on the living room lighting by receiving the instruction packet.

According to an embodiment of the present disclosure, the relay device 130 may receive the first instruction packet broadcast from the home network hub device 140 and transmit the same to the server device 110. For example, when the user selects an operation of turning on the living room lighting through the home network hub device 140 (e.g., wall pad), an instruction packet for turning on the living room lighting may be broadcast from the home network hub device 140 to the first group device 150 and the relay device 130. In this case, the relay device 130 having received the instruction packet may transmit the instruction packet to the server device 110, and the server device 110 may store the received instruction packet as a packet related to an operation of turning on the living room lighting.

In operation S402, based on first environment information obtained from the first group device 150 or the second group device 120, the server device 110 according to an embodiment of the present disclosure may identify a first scenario corresponding to the first environment information among a scenario list.

According to an embodiment of the present disclosure, the first group device 150 or the second group device 120 may transmit the first environment information to the server device 110. The first group device 150 or the second group device 120 may include various types of sensors for sensing environment information. For example, when the first group device 150 or the second group device 120 is an air conditioner, it may include a humidity sensor, a temperature sensor, and/or the like; when the first group device 150 or the second group device 120 is an air cleaner, it may include a dust sensor, a gas sensor, and/or the like; when the first group device 150 or the second group device 120 is a lighting device, it may include an illuminance sensor; and when the group device 150 or the second group device 120 is an induction range, an oven, or the like, it may include a temperature sensor. According to an embodiment of the present disclosure, the first group device 150 or the second group device 120 may obtain environment information through various sensors. The environment information may include fine dust information, temperature information, humidity information, noise information, and/or illuminance information; however, the present disclosure is not limited thereto.

According to an embodiment of the present disclosure, the first group device 150 or the second group device 120 may periodically transmit the environment information obtained through the sensors, to the server device 110. According to another embodiment of the present disclosure, the first group device 150 or the second group device 120 may transmit the environment information to the server device 110 when a particular event to be notified to the server device 110 has occurred. For example, when the first group device 150 or the second group device 120 is an air conditioner, the temperature information may be transmitted to the server device 110 when the temperature information is higher than a threshold value.

The server device 110 according to an embodiment of the present disclosure may identify a first scenario corresponding to the first environment information among the scenario list.

According to an embodiment of the present disclosure, the scenario list may include at least one scenario in which particular environment information is matched to at least one operation of the first group device 150 or the second group device 120. The scenario list may include a scenario pre-approved by the user. For example, the scenario list may include a scenario selected by the user among the scenarios recommended by the server device 110 and may include a scenario directly set by the user.

According to an embodiment of the present disclosure, the server device 110 may select a first scenario from the scenario list based on the received first environment information. For example, the server device 110 may select a first scenario including the first environment information. According to an embodiment of the present disclosure, the first scenario may include at least one operation of the first group device 150 or the second group device 120 corresponding to the first environment information.

For example, when the temperature information higher than the threshold value is received, the server device 110 may identify a first scenario corresponding to the temperature information higher than the threshold value.

In operation S403, based on the first scenario, the server device 110 according to an embodiment of the present disclosure may identify a first instruction packet for controlling an operation of the first group device 150 and a second instruction packet for controlling an operation of the second group device 120.

According to an embodiment of the present disclosure, the operation of the first group device 150 may be an operation related to the home appliance included in the first group device 150. For example, when the first group device 150 is a boiler, the operation of the first group device 150 may include an operation of turning off the boiler, an operation of turning on the boiler, and an operation of setting the temperature of the boiler to a certain temperature (e.g., 26 degrees in Celsius (C°)); however, the present disclosure is not limited thereto.

According to an embodiment of the present disclosure, the operation of the second group device 120 may be an operation related to the home appliance included in the second group device 120. For example, when the second group device 120 is an air conditioner, the operation of the second group device 120 may include an operation of turning off the air conditioner, an operation of turning on the air conditioner, and an operation of setting the temperature of the air conditioner to a certain temperature (e.g., 18 degrees in Celsius (C°)); however, the present disclosure is not limited thereto.

According to an embodiment of the present disclosure, when the first scenario includes an operation of turning off the boiler and turning on the air conditioner, the server device 110 may detect an instruction packet (first instruction packet) for controlling an operation of turning off the boiler and an instruction packet (second instruction packet) for controlling an operation of turning on the air conditioner.

In operation S404, the server device 110 may transmit the first instruction packet to the relay device 130 connected to the home network hub device 140 and may transmit the second instruction packet to the second group device 120.

According to an embodiment of the present disclosure, because the server device 110 is not directly connected to the first group device 150, the server device 110 may transmit the first instruction packet through the relay device 130. According to an embodiment of the present disclosure, the server device 110 may transmit the detected first instruction packet to the relay device 130 through a communication interface (e.g., a long-range communication interface such as the Internet). The relay device 130 having received the first instruction packet may transmit the received first instruction packet to the home network hub device 140 through serial communication (e.g., RS 485 communication). The home network hub device 140 may broadcast the received first instruction packet to the first group device 150 through serial communication (e.g., RS 485 communication), and the first group device 150 may perform an operation corresponding to the first instruction packet.

According to an embodiment of the present disclosure, because the server device 110 is directly connected to the second group device 120, the server device 110 may directly transmit the detected second instruction packet to the second group device 120 through a communication interface (e.g., the Internet). The second group device 120 having received the second instruction packet may perform an operation corresponding to the second instruction packet.

An operation of controlling, when environment information is received from the first group device 150, the first group device 150 or the second group device 120 based on a scenario including the environment information will be described in more detail with reference to FIG. 5.

Figure 5:
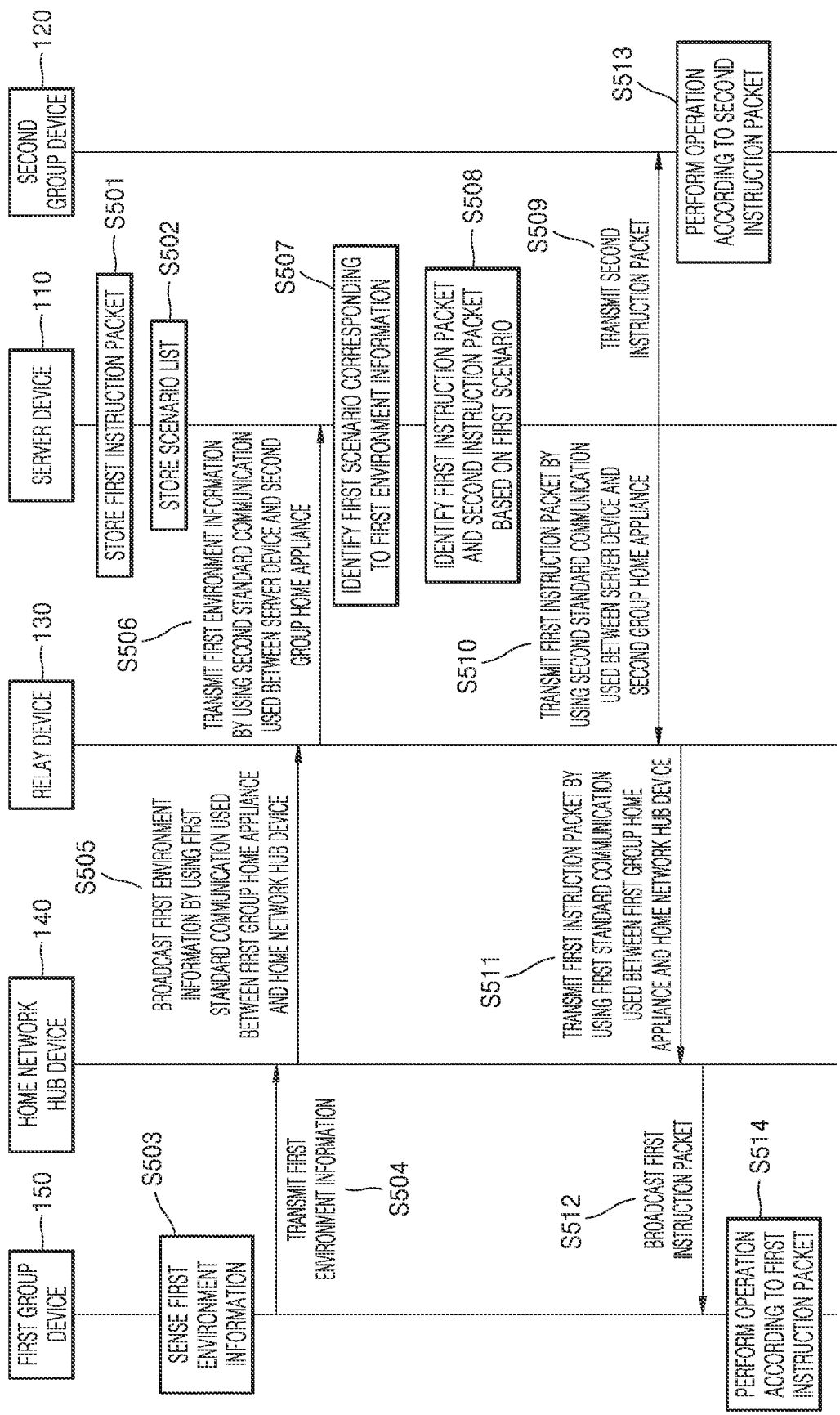
FIG. 5 is a flowchart for describing a method by which a server device controls a home appliance by receiving environment information from a first group home appliance, according to an embodiment of the present disclosure.

FIG. 5 is a flowchart for describing a method by which a server device controls a home appliance by receiving environment information from a first group device, according to an embodiment of the present disclosure.

In operation S501, the server device 110 according to an embodiment of the present disclosure may store a first instruction packet in the memory. According to an embodiment of the present disclosure, the relay device 130 may receive the first instruction packet broadcast from the home network hub device 140 and transmit the same to the server device 110. In this case, the server device 110 may store the first instruction packet received from the relay device 130, as a packet matched to an operation of the first group device 150.

In operation S502, the server device 110 according to an embodiment of the present disclosure may store a scenario list in the memory. The scenario list may include information about at least one scenario. The scenario list may include information in which particular environment information is matched to at least one operation of the first group device 150 or the second group device 120. The server device 110 may provide the scenario list to the user through the electronic device 160.

Figure 6:
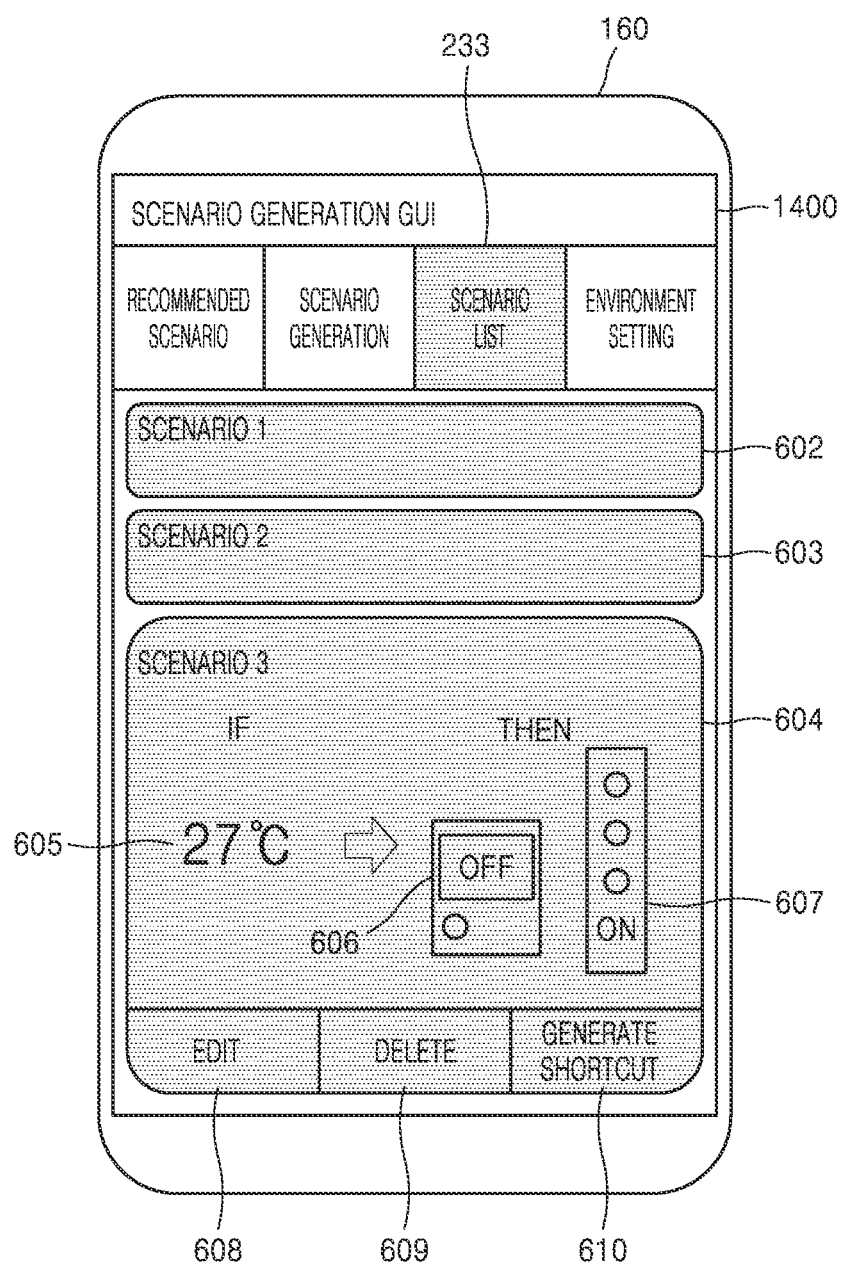
FIG. 6 is a diagram for describing a scenario list according to an embodiment of the present disclosure.

Referring to FIG. 6, the user may identify a scenario list 233 through the electronic device 160. For example, the scenario list 233 may include scenario 1 602, scenario 2 603, and scenario 3 604. Scenario 1 602, scenario 2 603, and scenario 3 604 may include environment information as condition information and may include an operation of the first group device 150 or the second group device 120 as execution information executed when the condition is satisfied.

For example, scenario 3 604 may include environment information 605 in which the indoor temperature satisfies 27 degrees in Celsius (C°), as condition information, and may include operations of turning off the boiler that is the first group device 150 (606) and turning on the air conditioner that is the second group device 120 (607), as execution information executed when the condition is satisfied.

According to an embodiment of the present disclosure, the scenario list 233 may be edited by the user. For example, referring to FIG. 6, the user may select an edit icon 608 to modify the condition information and execution information of scenario 3 604. The user may select a delete icon 609 to delete scenario 3 604 from the scenario list 233. The user may select a shortcut generation icon 610 to generate scenario 3 604 in the form of a shortcut on the background screen or home screen of the electronic device 160 and conveniently use the same. According to an embodiment of the present disclosure, the server device 110 may update the scenario list 233 according to an editing input from the user.

Referring back to FIG. 5, in operation S503, the first group device 150 according to an embodiment of the present disclosure may sense first environment information.

According to an embodiment of the present disclosure, the first group device 150 may include various types of sensors. For example, when the first group device 150 is a lighting device, the first group device 150 may include an illuminance sensor and/or the like.

The first group device 150 may obtain environment information through various sensors. The environment information may include temperature information, humidity information, noise information, and/or illuminance information; however, the present disclosure is not limited thereto.

In operation S504, the first group device 150 according to an embodiment of the present disclosure may transmit the obtained first environment information to the home network hub device 140.

According to an embodiment of the present disclosure, the first group device 150 may transmit the first environment information to the home network hub device 140 through serial communication (e.g., RS 485 communication).

According to an embodiment of the present disclosure, the first group device 150 may periodically upload the environment information obtained through the sensor, to the home network hub device 140. According to another embodiment of the present disclosure, the first group device 150 may upload the environment information to the home network hub device 140 when a particular event has occurred. For example, when the first group device 150 is a lighting device, when an illuminance value is higher than a threshold value, illuminance information of the illuminance value may be uploaded to the home network hub device 140.

In operation S505, the home network hub device 140 according to an embodiment of the present disclosure may transmit the received first environment information to the relay device 130.

According to an embodiment of the present disclosure, the home network hub device 140 may transmit the first environment information to the relay device 130 in a broadcasting manner through first standard communication. Here, the first standard communication may refer to serial communication (e.g., RS 485 communication) used between the first group device 150 and the home network hub device 140.

In operation S506, the relay device 130 according to an embodiment of the present disclosure may transmit the received first environment information to the server device 110.

According to an embodiment of the present disclosure, the relay device 130 may transmit the first environment information to the server device 110 through second standard communication. Here, the second standard communication may refer to wireless communication (e.g., WiFi) used between the second group device 120 and the server device 110.

In operation S507, the server device 110 according to an embodiment of the present disclosure may identify a first scenario corresponding to the first environment information.

The server device 110 according to an embodiment of the present disclosure may identify a first scenario corresponding to the received first environment information among the scenario list 233. According to an embodiment of the present disclosure, the scenario list 233 may include at least one scenario in which particular environment information is matched to at least one operation of the first group device 150 or the second group device 120.

For example, when the temperature information higher than the threshold value is received, the server device 110 may identify a first scenario corresponding to the temperature information higher than the threshold value.

In operation S508, the server device 110 according to an embodiment of the present disclosure may identify a first instruction packet and a second instruction packet based on the first scenario.

According to an embodiment of the present disclosure, the first instruction packet may be an instruction packet for controlling an operation of the first group device 150, and the second instruction packet may be an instruction packet for controlling an operation of the second group device 120.

For example, when the first scenario includes an operation of turning off the boiler and turning on the air conditioner when the temperature is higher than a particular threshold value, the server device 110 may detect a first instruction packet for controlling an operation of turning off the boiler and a second instruction packet for controlling an operation of turning on the air conditioner.

In operation S509, the server device 110 according to an embodiment of the present disclosure may transmit the second instruction packet to the second group device 120. According to an embodiment of the present disclosure, the server device 110 may transmit the detected second instruction packet to the second group device 120 through a wireless communication interface (e.g., the Internet).

In operation S510, the server device 110 according to an embodiment of the present disclosure may transmit the first instruction packet to the relay device 130. According to an embodiment of the present disclosure, the server device 110 may transmit the first instruction packet to the relay device 130 through second standard communication. Here, the second standard communication may refer to wireless communication (e.g., the Internet) used between the second group device 120 and the server device 110.

In operation S511, the relay device 130 according to an embodiment of the present disclosure may transmit the first instruction packet to the home network hub device 140. According to an embodiment of the present disclosure, the relay device 130 may transmit the first instruction packet to the home network hub device 140 through first standard communication. Here, the first standard communication may refer to serial communication (e.g., RS 485 communication) used between the first group device 150 and the home network hub device 140.

In operation S512, the home network hub device 140 according to an embodiment of the present disclosure may transmit the first instruction packet to the first group device 150. According to an embodiment of the present disclosure, the home network hub device 140 may transmit the first instruction packet to the first group device 150 in a broadcasting manner through serial communication (e.g., RS 485 communication).

In operation S513, the second group device 120 according to an embodiment of the present disclosure may perform an operation according to the second instruction packet.

For example, when the second group device 120 is an air conditioner and the second instruction packet is a packet corresponding to a command indicating to turn on the air conditioner, the air conditioner that is the second group device 120 may be turned on.

In operation S514, the first group device 150 according to an embodiment of the present disclosure may perform an operation according to the first instruction packet.

For example, when the first group device 150 is a boiler and the first instruction packet is a packet corresponding to a command indicating to turn off the boiler, the boiler that is the first group device 150 may be turned off.

Figure 7:
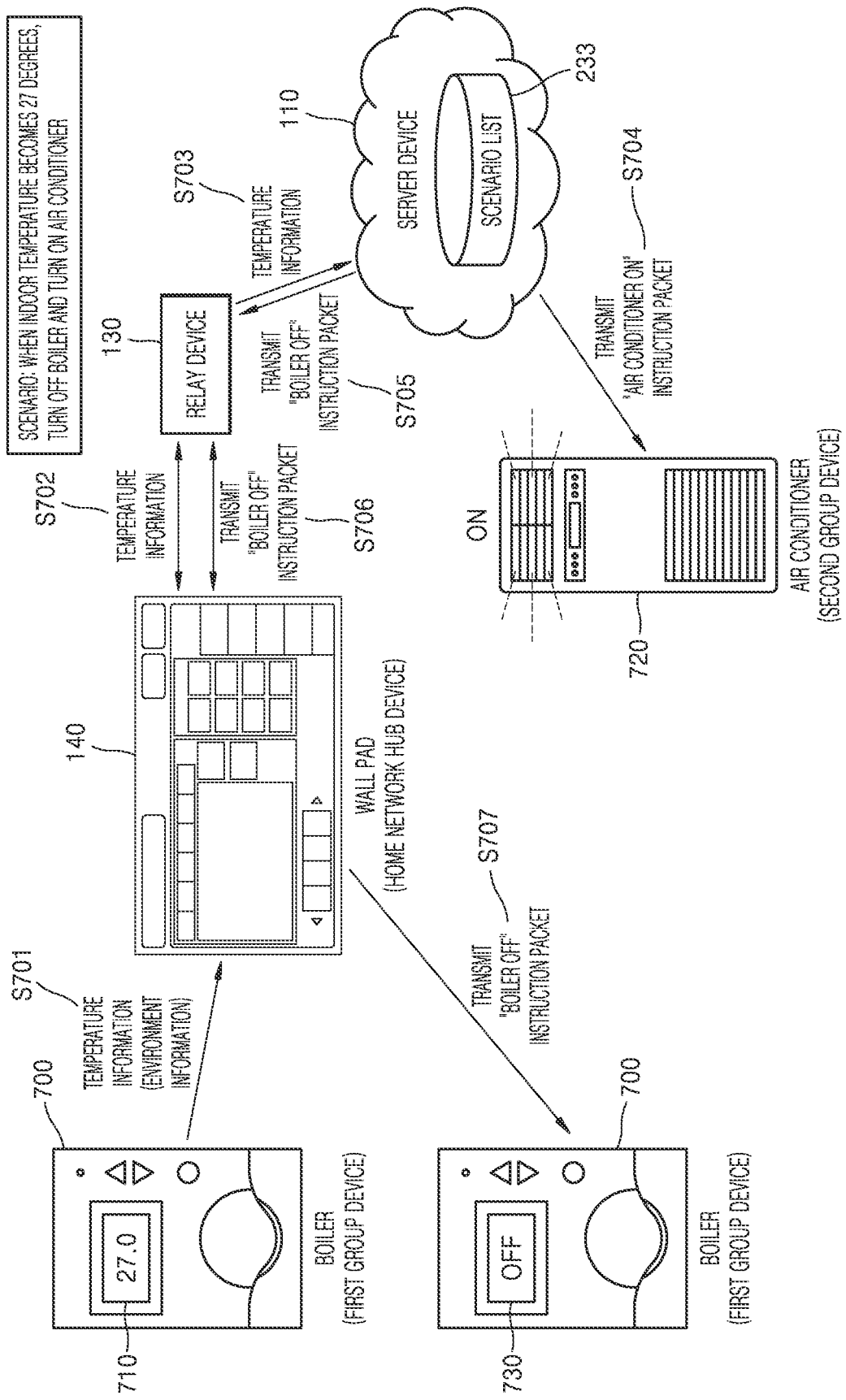
FIG. 7 is a diagram for describing an operation of controlling a home appliance by receiving environment information from a first group home appliance, according to an embodiment of the present disclosure.

FIG. 7 is a diagram for describing an operation of controlling a home appliance by receiving environment information from a first group home appliance, according to an embodiment of the present disclosure.

In FIG. 7, a case where a scenario in which the air conditioner is turned on and the boiler is turned off when a temperature value measured by the temperature sensor of a boiler 700 is higher than a threshold value is stored in the scenario list 233 will be described as an example.

Referring to FIG. 7, the boiler 700 may continuously measure a temperature value through the temperature sensor. The boiler 700 may transmit environment information corresponding to the indoor temperature value to the home network hub device 140 (e.g., wall pad) (operation S701). According to an embodiment of the present disclosure, when the indoor temperature is 27 degrees in Celsius (C°), the temperature value measured by the boiler 700 may be 27 degrees in Celsius (C°). In this case, the temperature displayed on the display of the boiler 700 may be changed to 27 degrees in Celsius (C°) (710).

When the home network hub device 140 (e.g., wall pad) according to an embodiment of the present disclosure receives the environment information corresponding to the indoor temperature value from the boiler 700, the wall pad may transmit the received environment information to the relay device 130 (operation S702). In this case, the home network hub device 140 (e.g., wall pad) may transmit the environment information to the relay device 130 in a broadcasting manner through serial communication (e.g., RS 485 communication).

When the relay device 130 according to an embodiment of the present disclosure receives the environment information from the home network hub device 140 (e.g., wall pad), the relay device 130 may transmit the received environment information to the server device 110 (operation S703).

The server device 110 may monitor the environment information received from the relay device 130 and detect a scenario corresponding to the environment information in which the indoor temperature is higher than 27 degrees in Celsius (C°), when the indoor temperature value included in the environment information is higher than a threshold value of 27 degrees in Celsius (C°).

Based on the detected scenario, the server device 110 may detect at least one first instruction packet or at least one second instruction packet included in the detected scenario. The server device 110 may generate first operation request information by using the detected first instruction packet and may generate second operation request information by using the detected second instruction packet. In this case, the first operation request information may include a first instruction packet indicating to turn off the boiler 700 that is the first group device 150 and first identification information that is destination information for transmitting the first instruction packet to the relay device 130. The second operation request information may include a second instruction packet indicating to turn on an air conditioner 720 that is the second group device 120 and second identification information that is destination information for transmitting the second instruction packet to the air conditioner 720 that is the second group device 120.

The server device 110 according to an embodiment of the present disclosure may identify the second identification information included in the second instruction packet and transmit the second instruction packet to the air conditioner 720 through the communication interface (operation S704). The air conditioner 720 having received the second instruction packet indicating to turn on the air conditioner 720 may perform an operation of turning on the air conditioner 720.

Also, the server device 110 may identify the first identification information included in the first instruction packet and transmit the first instruction packet to the relay device 130 through the communication interface (operation S705). The relay device 130 according to an embodiment of the present disclosure may transmit the first instruction packet indicating to turn off the boiler 700 to the home network hub device 140 (operation S706). In this case, the relay device 130 may transmit the first instruction packet to the home network hub device 140 by using serial communication (e.g., RS 485 communication).

The home network hub device 140 (e.g., wall pad) according to an embodiment of the present disclosure may broadcast the first instruction packet indicating to turn off the boiler 700 to all of the home appliances corresponding to the first group device 150 (operation S707). In this case, only the boiler 700 among the first group devices 150 may respond to the first instruction packet indicating to turn off the boiler 700, and the boiler 700 may perform an operation of turning off the boiler 700. Here, the display of the boiler 700 may display that the boiler is turned off (e.g., display "OFF") (730).

Figure 8:
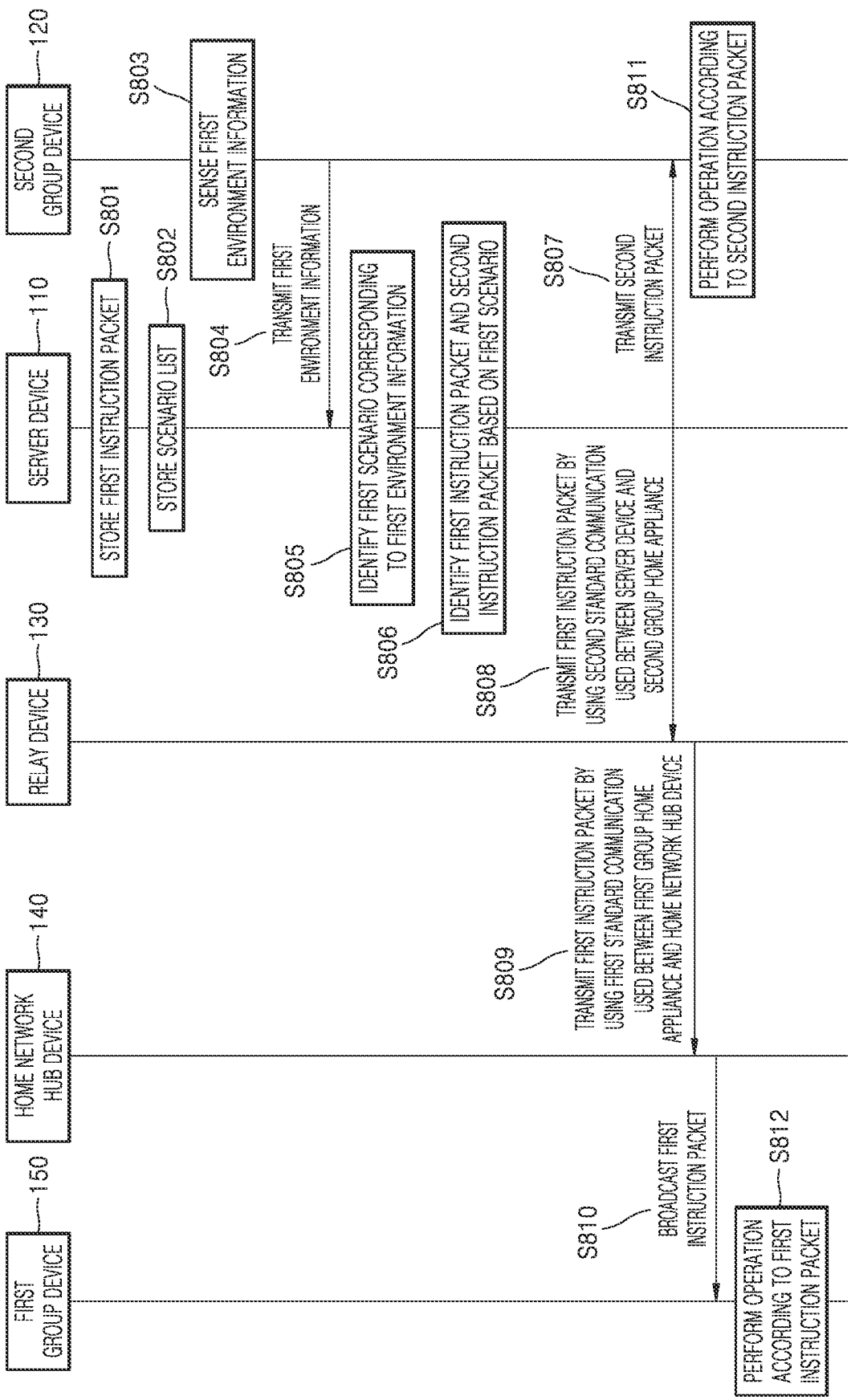
FIG. 8 is a flowchart for describing a method by which a server device controls a home appliance by receiving environment information from a second group home appliance, according to an embodiment of the present disclosure.

FIG. 8 is a flowchart for describing a method by which a server device controls a home appliance by receiving environment information from a second group home appliance, according to an embodiment of the present disclosure.

In operation S801, the server device 110 according to an embodiment of the present disclosure may store a first instruction packet in the memory. In operation S802, the server device 110 according to an embodiment of the present disclosure may store a scenario list in the memory. Because detailed descriptions of operations S801 and S802 are the same as those given above with reference to FIG. 5, redundant descriptions thereof will be omitted for conciseness.

In operation S803, the second group device 120 according to an embodiment of the present disclosure may sense first environment information.

According to an embodiment of the present disclosure, the second group device 120 may be a home appliance directly connected to the server device 110. For example, the second group device 120 may include a refrigerator, an air cleaner, an air conditioner, an audio device, a washing machine, a dryer, a clothing care machine, a TV, a dishwasher, an oven, a microwave oven, an air fryer, a water purifier, and the like; however, the present disclosure is not limited thereto. According to an embodiment of the present disclosure, the second group device 120 may include various types of sensors. For example, when the second group device 120 is an air conditioner, the second group device 120 may include a temperature sensor, a humidity sensor, and/or the like.

According to an embodiment of the present disclosure, the second group device 120 may obtain environment information through various sensors. The environment information may include temperature information, humidity information, noise information, and/or illuminance information; however, the present disclosure is not limited thereto.

In operation S805, the server device 110 according to an embodiment of the present disclosure may identify a first scenario corresponding to the first environment information.

The server device 110 according to an embodiment of the present disclosure may identify a first scenario corresponding to the received first environment information among the scenario list 233. According to an embodiment of the present disclosure, the scenario list 233 may include at least one scenario in which particular environment information is matched to at least one operation of the first group device 150 or the second group device 120.

In operation S806, the server device 110 according to an embodiment of the present disclosure may identify a first instruction packet and a second instruction packet based on the first scenario.

According to an embodiment of the present disclosure, the first instruction packet may be an instruction packet for controlling an operation of the first group device 150, and the second instruction packet may be an instruction packet for controlling an operation of the second group device 120.

In operation S807, the server device 110 according to an embodiment of the present disclosure may transmit the second instruction packet to the second group device 120. According to an embodiment of the present disclosure, the server device 110 may transmit the detected second instruction packet to the second group device 120 through a wireless communication interface (e.g., the Internet).

In operation S808, the server device 110 according to an embodiment of the present disclosure may transmit the first instruction packet to the relay device 130. According to an embodiment of the present disclosure, the server device 110 may transmit the first instruction packet to the relay device 130 through second standard communication. Here, the second standard communication may refer to wireless communication (e.g., the Internet) used between the second group device 120 and the server device 110.

In operation S809, the relay device 130 according to an embodiment of the present disclosure may transmit the first instruction packet to the home network hub device 140. According to an embodiment of the present disclosure, the relay device 130 may transmit the first instruction packet to the home network hub device 140 through first standard communication. Here, the first standard communication may refer to serial communication (e.g., RS 485 communication) used between the first group device 150 and the home network hub device 140.

In operation S810, the home network hub device 140 according to an embodiment of the present disclosure may transmit the first instruction packet to the first group device 150. According to an embodiment of the present disclosure, the home network hub device 140 may transmit the first instruction packet to the first group device 150 in a broadcasting manner through serial communication (e.g., RS 485 communication).

In operation S811, the second group device 120 according to an embodiment of the present disclosure may perform an operation according to the second instruction packet.

For example, when the second group device 120 is an air conditioner and the second instruction packet is a packet corresponding to a command indicating to turn on the air conditioner, the air conditioner that is the second group device 120 may be turned on.

In operation S812, the first group device 150 according to an embodiment of the present disclosure may perform an operation according to the first instruction packet.

For example, when the first group device 150 is a boiler and the first instruction packet is a packet corresponding to a command indicating to turn off the boiler, the boiler that is the first group device 150 may be turned off.

Figure 9:
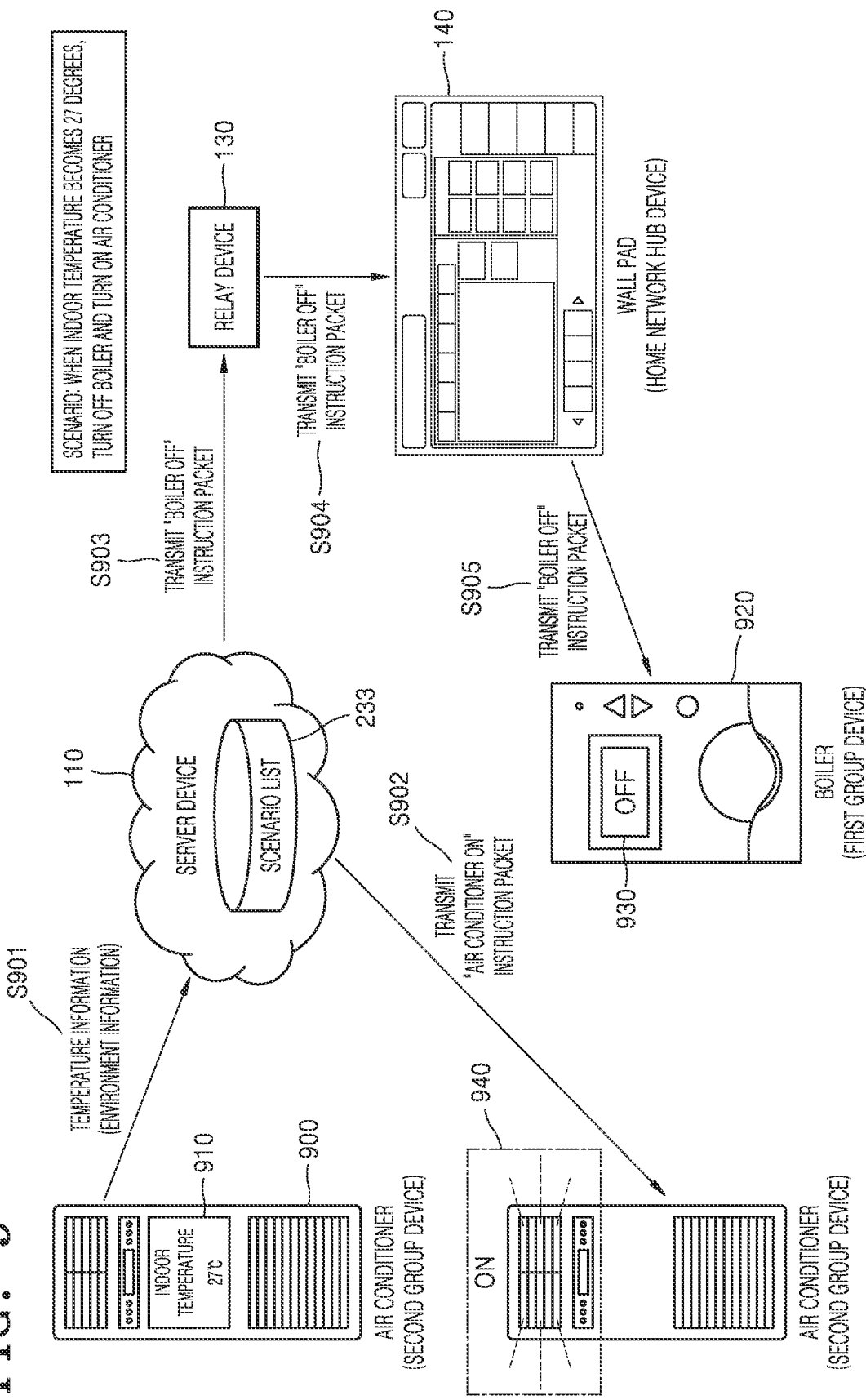
FIG. 9 is a diagram for describing an operation of controlling a home appliance by receiving environment information from a second group home appliance, according to an embodiment of the present disclosure.

FIG. 9 is a diagram for describing an operation of controlling a home appliance by receiving environment information from a second group home appliance, according to an embodiment of the present disclosure.

In FIG. 9, a case where a scenario in which the air conditioner is turned on and the boiler is turned off when a temperature value measured by the temperature sensor of an air conditioner 900 is higher than a threshold value is stored in the scenario list 233 will be described as an example.

Referring to FIG. 9, the air conditioner 900 may continuously measure an indoor temperature value through the temperature sensor. The air conditioner 900 may transmit environment information corresponding to the indoor temperature value to the server device 110 (operation S910). According to an embodiment of the present disclosure, when the indoor temperature is 27 degrees in Celsius (C°), the temperature value measured by the air conditioner 900 may be 27 degrees in Celsius (C°). In this case, the temperature displayed on the display of the air conditioner 900 may be changed to 27 degrees in Celsius (C°) (910).

The server device 110 may monitor the environment information received from the second group device 120 and detect a scenario corresponding to the environment information in which the indoor temperature is higher than 27 degrees in Celsius (C°), when the indoor temperature value included in the environment information is higher than a threshold value of 27 degrees in Celsius (C°).

Based on the detected scenario, the server device 110 may detect a first instruction packet indicating to turn off a boiler 920 and a second instruction packet indicating to turn on the air conditioner 900. In this case, the first instruction packet may include first identification information for transmission to the relay device 130, and the second instruction packet may include second identification information for transmission to the air conditioner 900 that is the second group device 120.

The server device 110 according to an embodiment of the present disclosure may identify the second identification information included in the second instruction packet and transmit the second instruction packet to the air conditioner 900 (operation S902). The air conditioner 900 having received the second instruction packet may perform an operation of turning on the air conditioner 900.

The server device 110 according to an embodiment of the present disclosure may identify the first identification information included in the first instruction packet and transmit the first instruction packet to the relay device 130 (operation S903). The relay device 130 may transmit the first instruction packet to the home network hub device 140 (operation S904), and the home network hub device 140 having received the first instruction packet may broadcast the first instruction packet to the first group device 150 (operation S905). In this case, only the boiler 920 among the first group devices 150 may respond to the first instruction packet indicating to turn off the boiler 920, and the boiler 920 may perform an operation of turning off the boiler 920. Here, the display of the boiler 920 may display that the boiler is turned off (e.g., display "OFF") (930).

Figure 10:
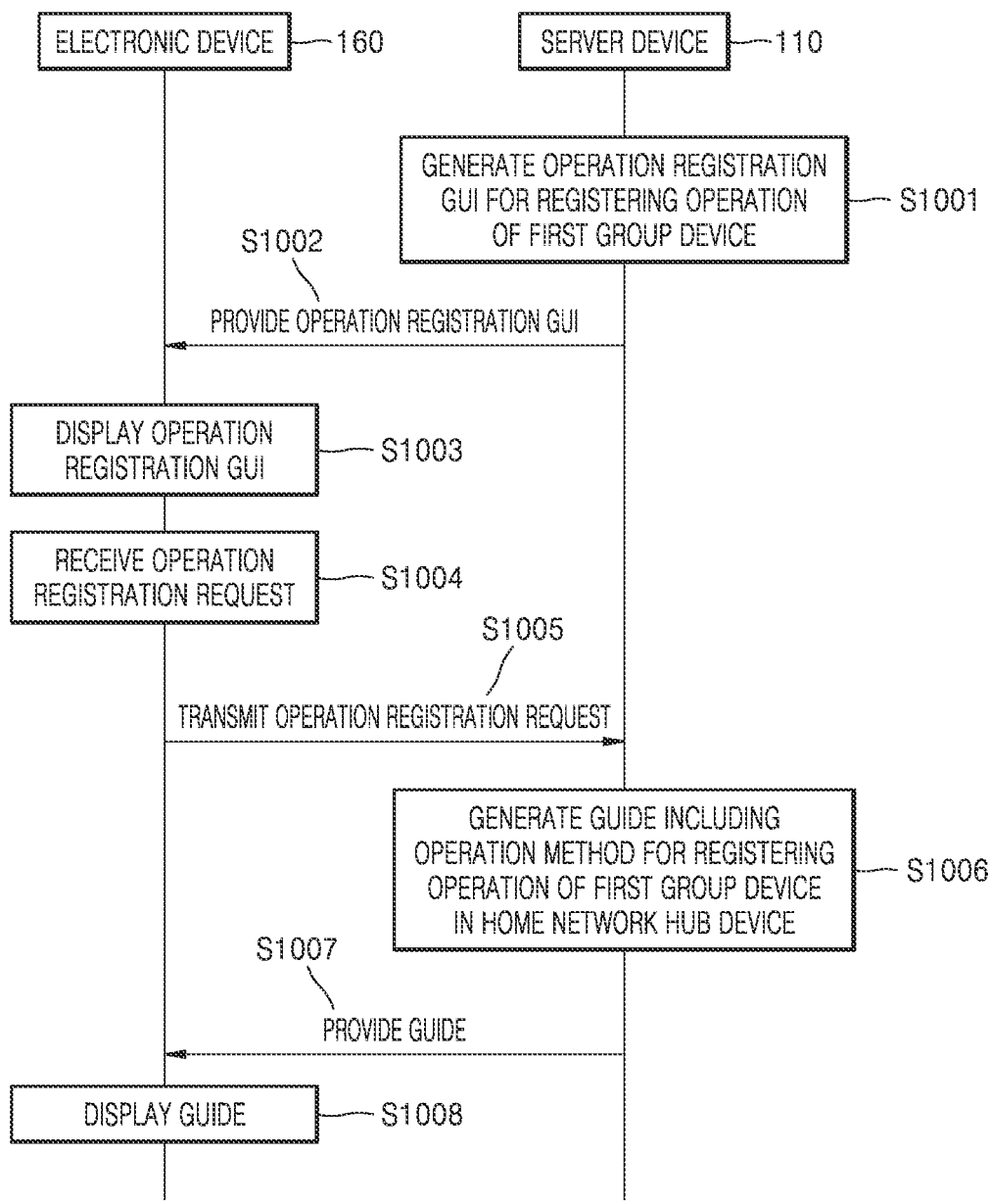
FIG. 10 is a flowchart for describing a method by which a server device provides guide information, according to an embodiment of the present disclosure.

FIG. 10 is a flowchart for describing by which a server device provides guide information, according to an embodiment of the present disclosure.

In operation S1001, the server device 110 according to an embodiment of the present disclosure may generate an operation registration GUI for registering an operation of the first group device 150.

According to an embodiment of the present disclosure, an instruction packet for controlling the first group device 150 may not be stored in the server device 110. Thus, in order to control the first group device 150 through the server device 110, an instruction packet for controlling an operation of the first group device 150 should be stored, and the instruction packet may be stored through the operation registration GUI.

Figure 11:
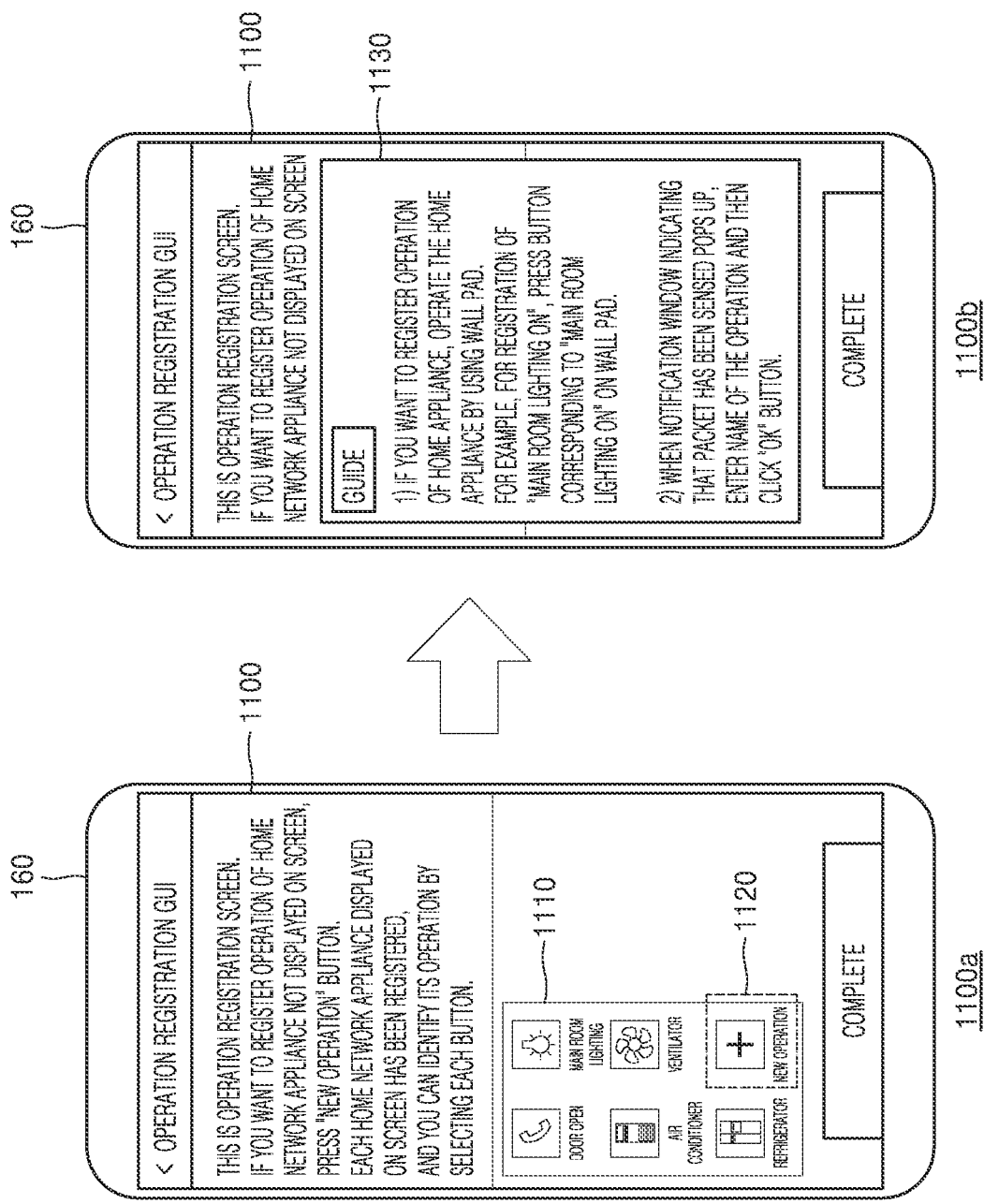
FIG. 11 is a diagram for describing an operation of a server device providing guide information, according to an embodiment of the present disclosure.

Referring to 1100a of FIG. 11, an operation registration GUI 1100 may include an operation list 1110 of a plurality of home appliances and a new operation icon 1120 for registering a new operation of the first group device 150.

The operation list 1110 of the plurality of home appliances may be a list of operations of the first group devices 150 registered in the server device 110. The operation list 1110 of the plurality of home appliances may include the names of the home appliances, the descriptions related to the operations of the home appliances, icon images, and/or the like. For example, there may be a case where an instruction packet for turning on a ventilator is stored in the server device 110. In this case, a ventilator icon image may be included in the operation list of the plurality of home appliances, and 'Ventilator-ON' may be displayed under the image. By clicking the icon displayed in the operation list 1110 of the plurality of home appliances, the user may identify whether the name, the description related to the operation, and the icon image match an actual operation of the home appliance. For example, the user may click the icon display as 'Ventilator-ON' and may identify whether the ventilator is actually turned on. In this case, when an actual operation of the ventilator and the name of the icon do not match each other, the name of the icon may be modified or the icon may be deleted.

The new operation icon 1120 may be an icon for registering an operation of the first group device 150 that is not registered in the server device 110. The user may click the new operation icon 1120 to register an instruction packet related to an operation of the first group device 150 that is not registered in the server device 110, in the server device 110.

Referring back to FIG. 10, in operation S1002, the server device 110 according to an embodiment of the present disclosure may provide the operation registration GUI to the electronic device 160. For example, when the electronic device 160 executes a particular application installed in the electronic device 160, the server device 110 may provide the operation registration GUI to the electronic device 160 through the particular application. The particular application may be an application for providing a service related to the home appliance including the first group device 150.

In operation 51003, the electronic device 160 according to an embodiment of the present disclosure may display the operation registration GUI.

According to an embodiment of the present disclosure, when the user executes a particular application installed in the electronic device 160, the electronic device 160 may display the operation registration GUI on an execution window of the particular application.

In operation S1004, the electronic device 160 according to an embodiment of the present disclosure may receive an operation registration request through the operation registration GUI.

For example, the electronic device 160 may receive an input for selecting the new operation icon 1120 through the operation registration GUI. In this case, when the new operation icon 1120 is selected, it may be determined that there is an operation registration request.

In operation S1005, the electronic device 160 according to an embodiment of the present disclosure may transmit the operation registration request to the server device 110. The server device 110 according to an embodiment of the present disclosure may receive an input for selecting the new operation icon 1120 through the electronic device 160. For example, the server device 110 may receive an input for selecting the new operation icon 1120 through the particular application executed in the electronic device 160.

In operation S1006, the server device 110 according to an embodiment of the present disclosure may generate a guide including an operation method for registering an operation of the first group device in the home network hub device.

According to an embodiment of the present disclosure, in order to register an instruction packet for controlling an operation of the first group device 150 in the server device 110, an action of directly controlling an operation of the first group device 150 through the home network hub device 140 may be required. According to an embodiment of the present disclosure, in order for the user to register an operation of the first group device 150 in the server device 110, the server device 110 may generate a guide including an operation method for controlling an operation of the first group device 150 through the home network hub device 140.

Referring to 1100b of FIG. 11, guide information 1130 may include a description of an action of the user for registering an operation of the first group device 150 in the server device 110. The server device 110 may store the guide information. When an input for selecting the new operation icon 1120 is received from the electronic device 160, the server device 110 may retrieve the stored guide information and transmit the guide information to the electronic device 160. For example, a text "1) If you want to register operation of home appliance, operate the home appliance by using wall pad (press button corresponding to "Main Room Lighting ON" on wall pad to register "Main Room Lighting ON") and 2) When notification window indicating that instruction packet has been sensed pops up, enter name of the operation and then click "OK" button" may be included in the guide information 1130. However, the present disclosure is not limited thereto.

In operation S1007, the server device 110 according to an embodiment of the present disclosure may provide the guide information 1130 to the electronic device 160. For example, the server device 110 may provide the guide information 1130 to the electronic device 160 through the particular application executed in the electronic device 160.

In operation S1008, the electronic device 160 according to an embodiment of the present disclosure may display the guide information 1130.

According to an embodiment of the present disclosure, when the user selects the new operation icon 1120 through the executed application, the electronic device 160 may display a guide screen on the execution window of the application.

Figure 12:
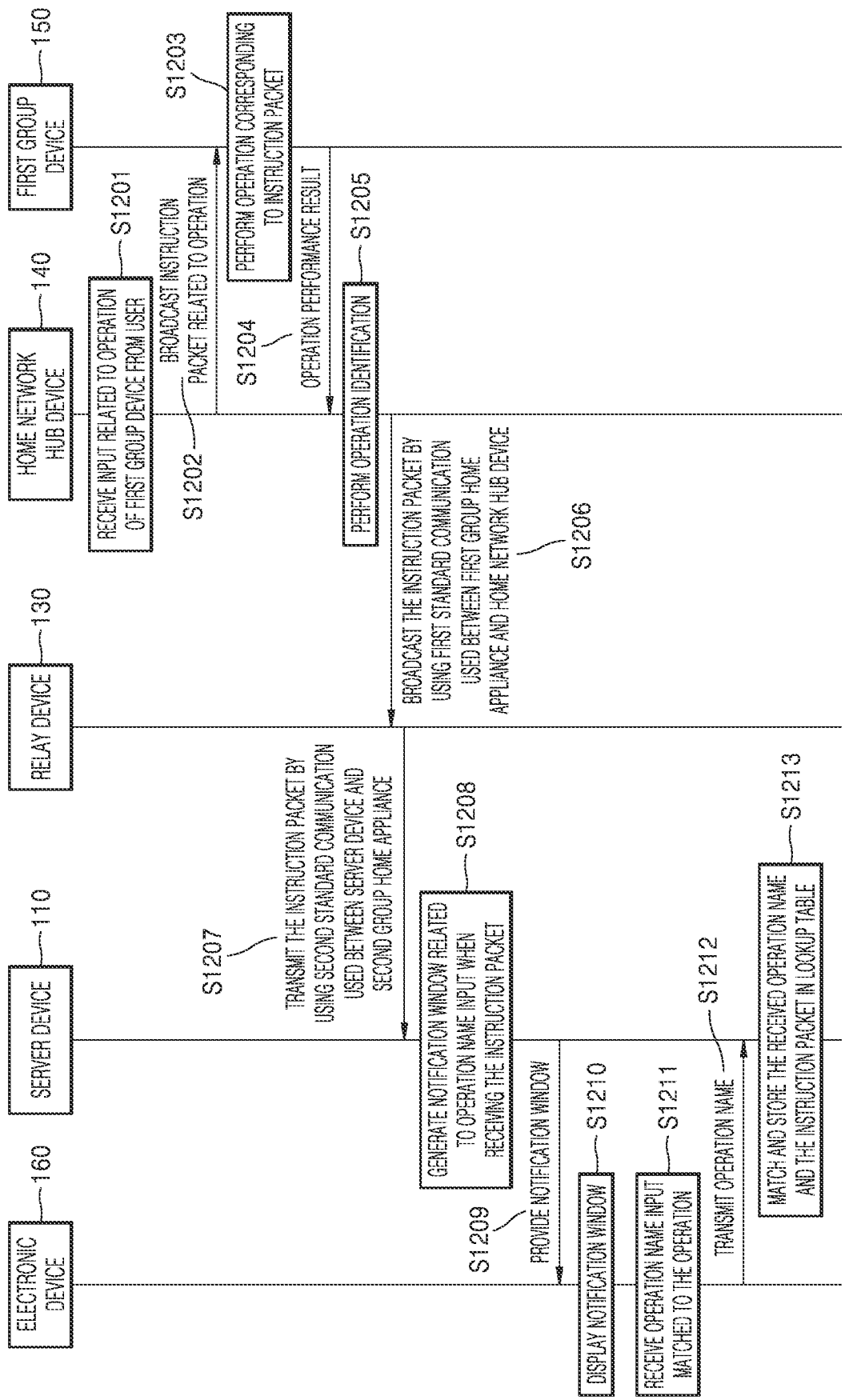
FIG. 12 is a flowchart for describing a method by which a server device stores an instruction packet of a first group device, according to an embodiment of the present disclosure.

FIG. 12 is a flowchart for describing by which a server device stores an instruction packet of a first group device, according to an embodiment of the present disclosure.

In operation S1201, the home network hub device 140 according to an embodiment of the present disclosure may receive an input related to an operation of the first group device from the user.

Here, the input related to the operation of the first group device may refer to an input related to an operation of the first group device 150 that the user wants to register in the server device 110. For example, when the user wants to register an instruction packet related to an operation of turning on the main room lighting in the server device 110, the user may touch a button for turning on the main room lighting on the screen of the home network hub device 140 (e.g., wall pad). Here, the input related to the operation of the first group device 150 may be an input related to the "operation of turning on the main room lighting".

In operation S1202, the home network hub device 140 according to an embodiment of the present disclosure may broadcast an instruction packet related to the input received from the user.

According to an embodiment of the present disclosure, the home network hub device 140 and the first group device 150 may be connected through serial communication (e.g., RS 485 communication). Accordingly, the home network hub device 140 may identify an operation of the first group device 150 in the input received from the user and may broadcast an instruction packet related to the operation to all of the home appliances corresponding to the first group device 150. For example, when the input received from the user is an input related to the "operation of turning on the main room lighting", the home network hub device 140 may identify the "operation of turning on the main room lighting" in the input and may broadcast an instruction packet related to the identified operation.

In operation S1203, the first group device 150 according to an embodiment of the present disclosure may perform an operation corresponding to the instruction packet in response to the instruction packet.

For example, when the home network hub device 140 broadcasts an instruction packet related to the "operation of turning on the main room lighting", all of the home appliances corresponding to the first group device 150 may receive the instruction packet. In this case, only the "main room lighting" among the first group devices 150 may respond to the instruction packet related to the "operation of turning on the main room lighting", and the "main room lighting" may perform an operation of turning on the lighting.

In operation S1204, the first group device 150 according to an embodiment of the present disclosure may transmit the operation performance result to the home network hub device 140.

According to an embodiment of the present disclosure, when the first group device 150 performs an operation corresponding to the instruction packet, the operation performance result may be transmitted as feedback to the home network hub device 140. For example, when the "main room lighting" among the first group devices 150 performs an operation according to the instruction packet, the result of the performance of the "operation of turning on the main room lighting" may be transmitted as feedback to the home network hub device 140.

In operation S1205, the home network hub device 140 according to an embodiment of the present disclosure may receive the operation performance result and then perform operation identification.

According to an embodiment of the present disclosure, the home network hub device 140 may monitor the current operation state of the first group device 150 connected to the home network hub device 140. For example, the home network hub device 140 may always monitor whether the living room lighting is turned on or off or whether the living room lighting is turned on or off.

According to an embodiment of the present disclosure, the operation identification may be identification of whether the operation actually performed in response to the instruction packet is an operation matching the button touched on the screen of the home network hub device 140. In this case, the operation identification may be performed by using information obtained by monitoring the current operation state of the first group device 150 by the home network hub device 140. For example, when there is a touch on the "button for turning on the main room lighting" in the home network hub device 140, it may identify whether the operation performed in response to the instruction packet according to the touch input corresponds to an operation of actually turning on the main room lighting. That is, by using the information obtained by monitoring the current operation state of the first group device 150, the home network hub device 140 may identify whether the main room lighting actually corresponds to the turned-on state and may identify whether it corresponds to the touch input.

In operation S1206, the home network hub device 140 according to an embodiment of the present disclosure may broadcast the instruction packet related to the operation to the relay device 130.

According to an embodiment of the present disclosure, the home network hub device 140 and the relay device 130 may be connected through serial communication (e.g., RS 485 communication). As a result of the home network hub device 140 performing the operation identification (S1205), when it is determined that the operation of the first group device included in the received input matches the actually performed operation, the same instruction packet as the instruction packet broadcast to the first group device 150 may be broadcast to the relay device 130.

For example, when the home network hub device 140 receives an input related to the "operation of turning on the main room lighting", when an operation performed in response to an instruction packet according to the received input is identified as an operation of actually turning on the main room lighting, the instruction packet may be broadcast to the relay device 130.

In operation S1207, the relay device 130 according to an embodiment of the present disclosure may transmit the instruction packet received from the home network hub device 140, to the server device 110. In this case, the relay device 130 may transmit the instruction packet to the server device 110 by using wireless communication (e.g., WiFi).

In operation S1208, the server device 110 according to an embodiment of the present disclosure may generate a notification window related to the operation name input when receiving the instruction packet.

According to an embodiment of the present disclosure, the server device 110 may generate a notification window including a method of inputting the name of the operation in order to register the instruction packet related to the operation of the first group device 150 in the operation list 1110 in the operation registration GUI. The notification window according to an embodiment of the present disclosure may include a user input interface through which the user inputs the name of the home appliance and the name of the operation of the home appliance to be registered.

In operation S1209, the server device 110 according to an embodiment of the present disclosure may provide the notification window to the electronic device 160. In operation S1210, the electronic device 160 may display the notification window. In operation S1211, the electronic device 160 may receive an input related to the name of the home appliance and the name of the operation of the home appliance to be registered. For example, when the user wants to register an instruction packet related to the "operation of turning on the main room lighting", the user may input "Main Room Lighting, ON" or "Main Room Lighting, Operation of Turning on" in the user input interface of the notification window. However, the present disclosure is not limited thereto.

In operation S1212, the electronic device 160 according to an embodiment of the present disclosure may transmit the operation name input from the user, to the server device 110. In operation S1213, the server device 110 according to an embodiment of the present disclosure may match and store the received operation name and the instruction packet in a lookup table.

According to an embodiment of the present disclosure, the server device 110 may store an instruction packet related to an operation of the first group device 150, which the user wants to register, in the memory in the form of a lookup table. In this case, the server device 110 may match and store the operation name input from the user and the instruction packet related to the operation.

Figure 13B:
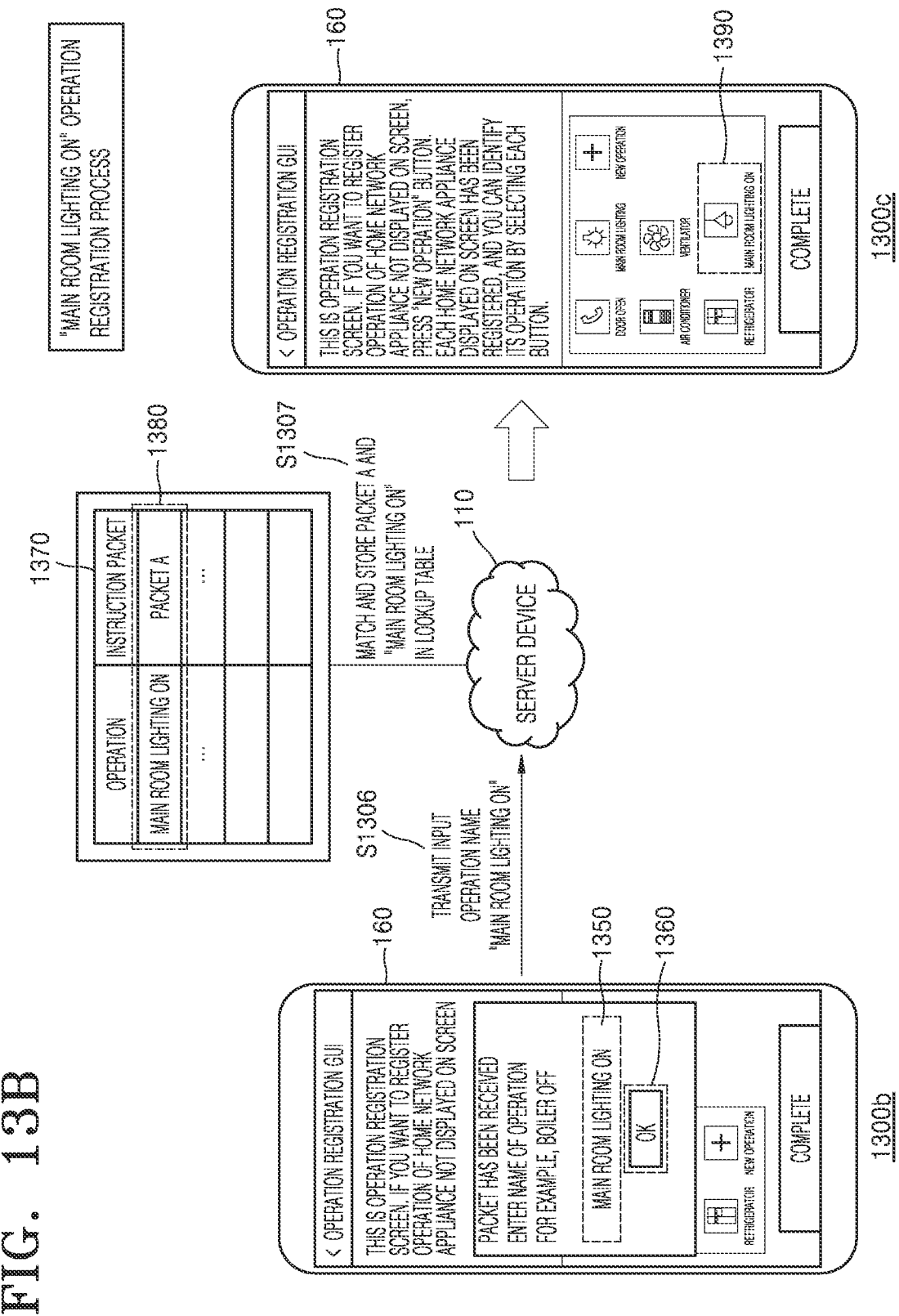

FIGS. 13A and 13B are diagrams for describing an operation of a server device storing an instruction packet of a first group device, according to an embodiment of the present disclosure.

In FIGS. 13A and 13B, a case where the user registers an instruction packet for turning on the main room lighting among the first group devices 150 in the server device 110 through the operation registration GUI will be described as an example.

Referring to 1300*a* of FIG. 13A, in order for the user to register the "operation of turning on the main room lighting", a button 1310 for turning on the main room lighting may be touched on a screen 1300 of the home network hub device (wall pad) 140 according to the guide screen 1130 of FIG. 11. In this case, the home network hub device 140 may sense that an input event of touching the button 1310 for turning on the main room lighting on the screen 1300 of the home network hub device 140 has occurred. Also, the home network hub device 140 may broadcast, to the main room lighting 1320, "Instruction Packet A" for controlling to turn on the main room lighting corresponding to the touch input of the button 1310 for turning on the main room lighting (operation S1301).

When the main room lighting 1320 receives "Instruction Packet A" for controlling to turn on the main room lighting from the home network hub device 140, the main room lighting 1320 may perform an operation of turning on the main room lighting according to "Instruction Packet A". Also, the main room lighting 1320 may transmit the operation performance result to the home network hub device 140 (operation S1320).

When the home network hub device 140 receives the operation performance result from the main room lighting 1320, the home network hub device 140 may identify whether the operation performed in response to "Instruction Packet A" is an operation matching the button 1310 touched on the screen 1300 of the home network hub device 140. That is, it may verify whether "Instruction Packet A" broadcast when the button 1310 for turning on the main room lighting is touched on the screen 1300 of the home network hub device 140 corresponds to an instruction packet for controlling an operation of actually turning on the main room lighting.

As a result of performing the operation identification by the home network hub device 140, when it is verified that "Instruction Packet A" corresponds to an instruction packet for controlling an operation of actually turning on the main room lighting, "Instruction Packet A" may be broadcast to the relay device 130 (operation S1303). In this case, the home network hub device 140 may broadcast "Instruction Packet A" to the relay device 130 through serial communication (e.g., RS 485 communication).

When the relay device 130 receives "Instruction Packet A", the relay device 130 may transmit "Instruction Packet A" to the server device 110 (operation S1304). In this case, the relay device 130 may transmit "Instruction Packet A" to the server device 110 by using wireless communication (e.g., WiFi).

When the server device 110 receives "Instruction packet A", the server device 110 may generate a notification window 1330 related to the operation name input and provide the generated notification window 1330 to the electronic device 160 (operation S1305). The electronic device 160 may display the notification window 1330 in a pop-up form on the operation registration GUI 1100. The notification window 1330 according to an embodiment of the present disclosure may include a user input interface 1340 through which the user inputs the name of the home appliance and the name of the operation of the home appliance to be registered.

Referring to 1300*b* of FIG. 13B, the user may input "Main Room Lighting" that is the name of the home appliance to be registered and "ON" that is the operation name into the user input interface 1340 of the notification window 1330 displayed in a pop-up form (1350). However, the present disclosure is not limited thereto, and the user may input variously such as "Operation of Turning on Main Room Lighting" or "Turning on Main Room Lighting". When the user inputs the home appliance name and the operation name into the user input interface 1340 of the notification window 1330 and then touches the "OK" button, the electronic device 160 may transmit the home appliance name and operation name ("Main Room Lighting ON") 1350 input from the user, to the server device 110 (operation S1306).

When the server device 110 receives the home appliance name and operation name ("Main Room Lighting ON") 1350 from the electronic device 160, it may match and store the home appliance name and operation name ("Main Room Lighting ON") 1350 and the "Instruction Packet A" received from the relay device 130, in a lookup table 1370 in the memory (operation S1307). In this case, "Instruction packet A" for controlling an operation of turning on the main room lighting may be matched to the home appliance name and operation name "Main Room Lighting ON (1350)" input from the user and stored in the lookup table 1370 (1380).

Referring to 1300*c* of FIG. 13B, the electronic device 160 may display an icon 1390 corresponding to "Instruction Packet A" stored in the lookup table 1370, in the operation list 1110 of the plurality of home appliances of the operation registration GUI 1100. The home appliance name and operation name "Main Room Lighting ON (1350)" input from the user may be included in the icon 1390 according to an embodiment of the present disclosure. An icon image pre-stored corresponding to "Room Lighting" in the memory of the electronic device 160 may be included in the icon 1390 according to an embodiment of the present disclosure. However, the present disclosure is not limited thereto, and the icon image may be directly selected by the user.

Figure 14:
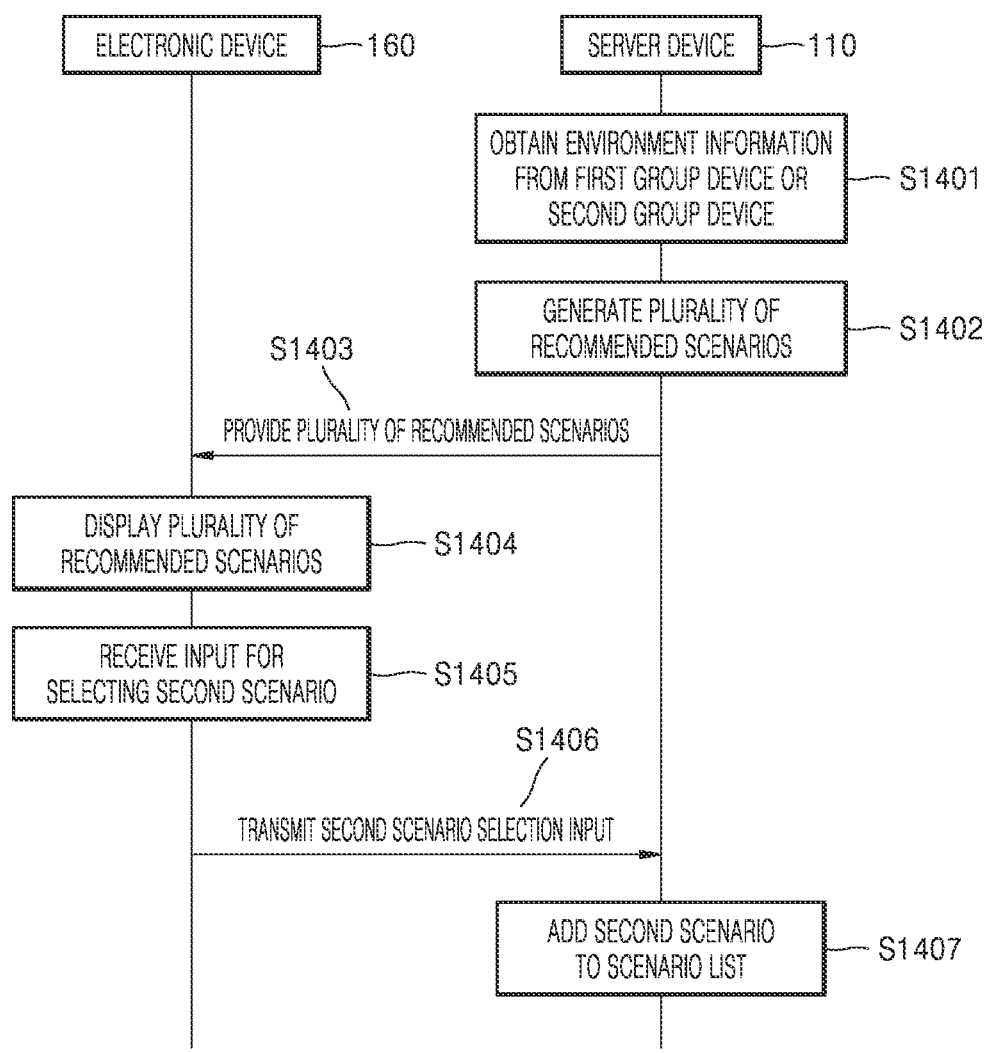
FIG. 14 is a flowchart for describing a method by which a server device provides a plurality of recommended scenarios, according to an embodiment of the present disclosure.

FIG. 14 is a flowchart for describing by which a server device provides a plurality of recommended scenarios, according to an embodiment of the present disclosure.

In operation S1401, the server device 110 according to an embodiment of the present disclosure may obtain environment information from the first group device 150 or the second group device 120.

According to an embodiment of the present disclosure, the first group device 150 or the second group device 120 may transmit the environment information to the server device 110. The first group device 150 or the second group device 120 may include various types of sensors for sensing environment information. For example, when the first group device 150 or the second group device 120 is an air conditioner, it may include a humidity sensor, a temperature sensor, and/or the like; and when the first group device 150 or the second group device 120 is an air cleaner, it may include a dust sensor, a gas sensor, and/or the like. According to an embodiment of the present disclosure, the first group device 150 or the second group device 120 may obtain environment information through various sensors and transmit the obtained environment information to the server device 110. The environment information according to an embodiment of the present disclosure may include fine dust information, temperature information, humidity information, noise information, and/or illuminance information; however, the present disclosure is not limited thereto.

In operation S1402, the server device 110 according to an embodiment of the present disclosure may generate a plurality of recommended scenarios by using at least one piece of obtained environment information.

For example, the server device 110 may generate a plurality of recommended scenarios by matching at least one piece of obtained environment information to at least one operation of the first group device 150 or the second group device 120. In this case, the recommended scenario may include environment information and operation information of the first group device 150 or the second group device 120. For example, the server device 110 may generate a first recommended scenario in which a humidifier that is a second group device is turned on when the indoor humidity is 40% or less and a second recommended scenario in which a boiler that is a first group device is turned on and an air conditioner that is a second group device is turned off when an indoor temperature of 13 degrees in Celsius (C°) is satisfied.

According to an embodiment of the present disclosure, the server device 110 may generate a recommended scenario by considering the user's utilization. For example, the server device 110 may generate a recommended scenario based on information about the number of times the user uses the home appliance, context information of the user collected from the user's mobile terminal (e.g., information about the time when the user mainly stays indoors), information about the scenarios selected by other users, and/or the like.

According to an embodiment of the present disclosure, the server device 110 may generate a recommended scenario by using an artificial intelligence model. The artificial intelligence models may be generated or updated (refined) by learning the scenarios used by users. The artificial intelligence model may be stored in the memory of the server device 110 and may be continuously updated.

In operation S1403, the server device 110 according to an embodiment of the present disclosure may transmit the plurality of recommended scenarios to the electronic device 160.

For example, when the electronic device 160 executes a particular application installed in the electronic device 160, the server device 110 may provide the plurality of recommended scenarios to the electronic device 160 through the particular application. The particular application may be an application for providing a service related to the first group device 150 or the second group device 120.

In operation S1404, the electronic device 160 according to an embodiment of the present disclosure may display the plurality of recommended scenarios.

According to an embodiment of the present disclosure, when the user executes a particular application installed in the electronic device 160, the electronic device 160 may display the plurality of recommended scenarios on the execution window of the particular application.

Figure 15:
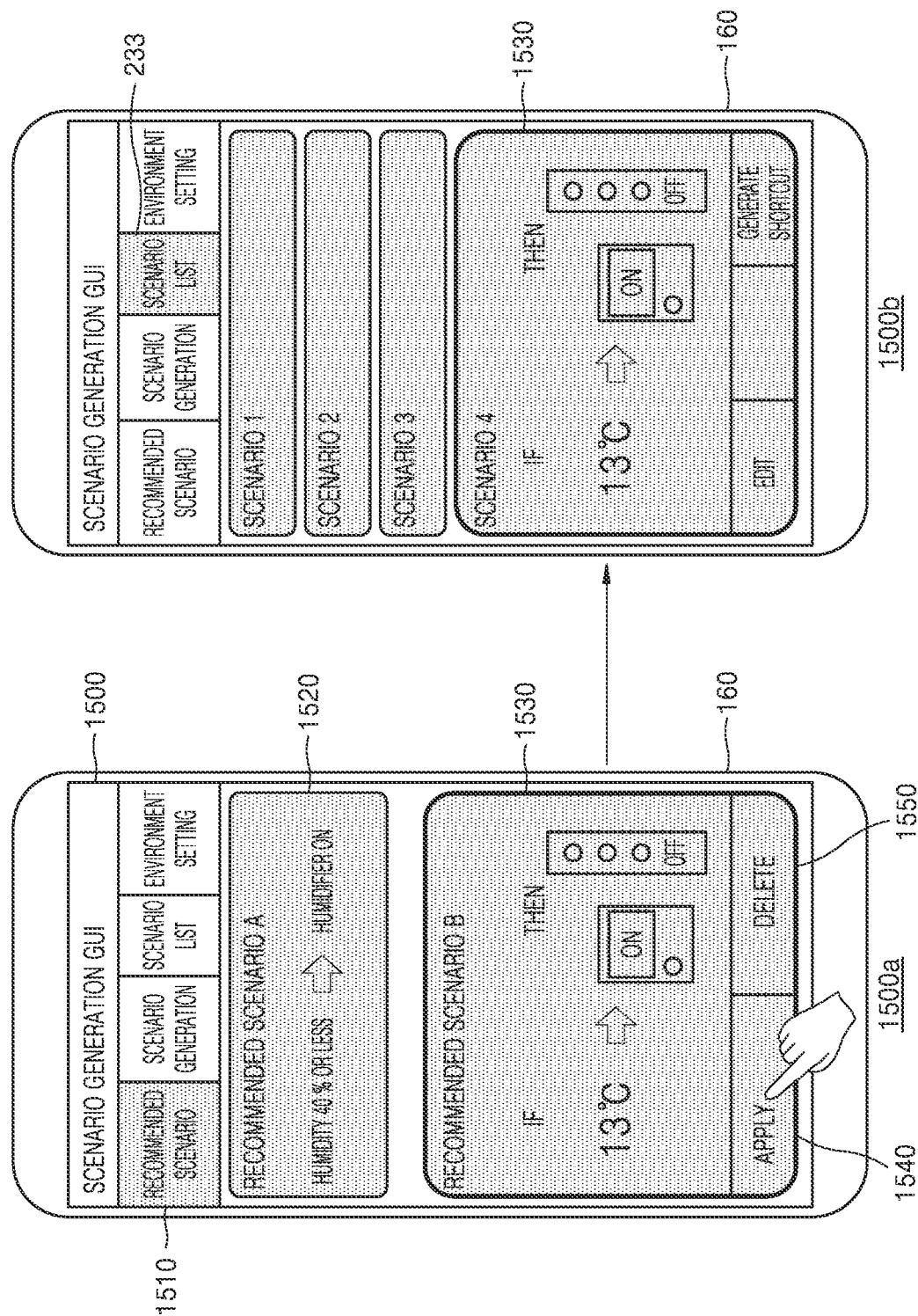
FIG. 15 is a diagram for describing an operation of a server device providing a plurality of recommended scenarios, according to an embodiment of the present disclosure.

For example, referring to 1500*a* of FIG. 15, the electronic device 160 may display a recommended scenario list 1510 on an execution window 1500 of a particular application. For example, the recommended scenario list 1510 may include a recommended scenario A 1520 in which the humidifier is turned on when the humidity is 40% or less, a recommended scenario B 1530 in which the boiler is turned on and the air conditioner is turned off when the indoor temperature is 13 degrees in Celsius (C°), and the like.

Referring back to FIG. 14, in operation S1405, the electronic device 160 according to an embodiment of the present disclosure may receive an input for selecting a second scenario related to second environment information from among the plurality of recommended scenarios.

The type of second environment information may be various. For example, the second environment information may include fine dust information, temperature information, humidity information, noise information, and/or illuminance information; however, the present disclosure is not limited thereto.

The second scenario may be a recommended scenario in which the second environment information is matched to at least one operation of the first group device 150 or the second group device 120. According to an embodiment of the present disclosure, the at least one operation of the first group device 150 or the second group device 120 may include an operation of turning on or off the first group device 150 or the second group device 120, an operation of changing the mode of the first group device 150 or the second group device 120 (e.g., in the case of an air conditioner, changing from a cooling mode to a dehumidifying mode, or the like), and/or an operation of calling the first group device 150 or the second group device 120 (e.g., in case of an elevator, calling the elevator, or the like); however, the present disclosure is not limited thereto.

In operation S1406, the electronic device 160 according to an embodiment of the present disclosure may transmit an input for selecting the second scenario to the server device 110.

The server device 110 according to an embodiment of the present disclosure may receive an input for selecting the second scenario related to the second environment information among the plurality of recommended scenarios through the electronic device 160. For example, the server device 110 may receive an input for selecting the second scenario through a particular application executed in the electronic device 160.

Referring to 1500*a* of FIG. 15, the server device 110 may receive a user input for selecting the recommended scenario B 1530 among the recommended scenario list 1510 displayed on the electronic device 160. For example, the user may check the recommended scenario list 1510 through the electronic device 160 and select the recommended scenario B 1530 (when the indoor temperature reaches 13 degrees in Celsius (C°), the boiler is turned on and the air conditioner is turned off) to be used among the recommended scenario list 1510. In this case, the user may select the recommended scenario B by touching an apply button 1540 at the bottom of the recommended scenario B and may delete the recommended scenario B from the recommended scenario list 1510 by touching a delete button 1550.

Referring back to FIG. 14, in operation S1407, the server device 110 according to an embodiment of the present disclosure may add the second scenario to the scenario list 233. Thereafter, the server device 110 may control an operation of the first group device 150 or the second group device 120 according to the second scenario when the second environment information related to the second scenario is received.

For example, referring to 1500*b* of FIG. 15, when the server device 110 receives a user input for selecting the recommended scenario B 1530 among the recommended scenario list 1510, the server device 110 may add the recommended scenario B 1530 to the scenario list 233. Thereafter, the user may identify the recommended scenario B 1530 in the scenario list 233. Also, when the server device 110 receives environment information indicating that the indoor temperature has become 13 degrees in Celsius (C°), the server device 110 may transmit a control command indicating to turn on the boiler to the boiler and transmit a control command indicating to turn off the air conditioner to the air conditioner, according to the recommended scenario B 1530.

According to an embodiment of the present disclosure, by generating and providing a recommended scenario by considering the user's utilization, the server device 110 may allow the user to select and use a useful scenario. Hereinafter, a method by which the user directly defines a scenario will be described in detail with reference to FIG. 16.

Figure 16:
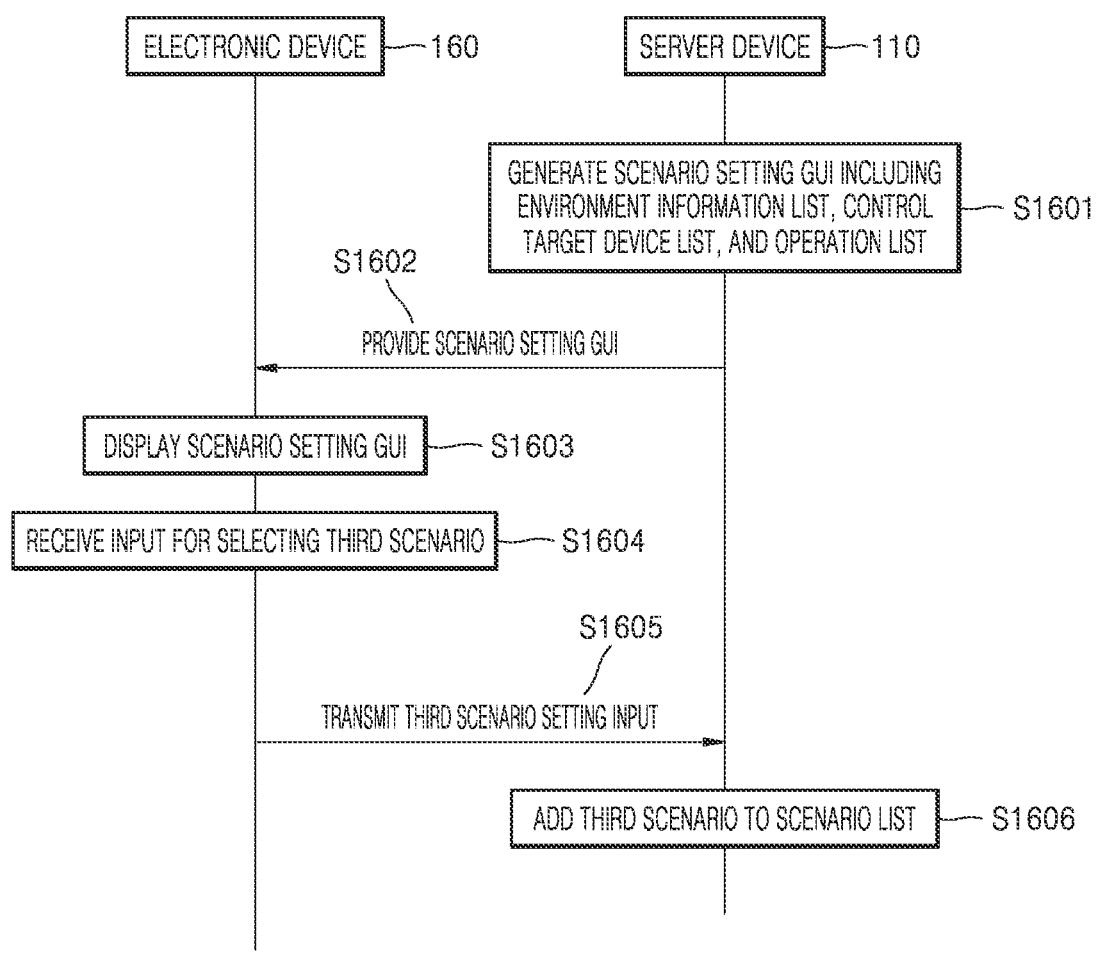
FIG. 16 is a flowchart for describing a method by which a server device provides a scenario setting graphical user interface (GUI), according to an embodiment of the present disclosure.

FIG. 16 is a flowchart for describing by which a server device provides a scenario setting GUI, according to an embodiment of the present disclosure.

In operation S1601, the server device 110 according to an embodiment of the present disclosure may generate a scenario setting GUI including an environment information list, a control target device list, and an operation list.

The environment information list may be an environment information list obtained by the server device 110 from the first group device 150 or the second group device 120. The environment information list may include at least one environment condition candidate selectable by the user. The environment information according to an embodiment of the present disclosure may include temperature information, humidity information, noise information, fine dust information, and/or illuminance information; however, the present disclosure is not limited thereto.

The control target device list may be a home appliance list registered in the server device 110, and the home appliance may be the first group device 150 or the second group device 120. The control target device list may include the names, nicknames, and icon images of the home appliances.

According to an embodiment of the present disclosure, when several home appliances of the same type are registered in the server device 110, the server device 110 may display the nicknames of the home appliances of the same type in the home appliance list. Also, when several home appliances of the same type are registered in the server device 110, the server device 110 may display the positions of the home appliances of the same type in the home appliance list. For example, when there are several lighting devices in the house and all of the lighting devices are registered in the server device 110, the server device 110 may display 'Lighting Device 1—Living Room', 'Lighting Device 2—Main Room', 'Lighting Device 3—Kitchen', and the like in the home appliance list.

Operations related to the control of the home appliances registered in the server device 110 may be displayed in the operation list. For example, when the air conditioner is selected from the home appliance list registered in the server device 110, the operation list of the air conditioner may include operations (turn on, turn off, and the like), operation modes (comfort mode, cooling mode, dehumidifying mode, cleaning mode, and the like), desired temperature setting, and/or the like; however, the present disclosure is not limited thereto.

In operation S1602, the server device 110 according to an embodiment of the present disclosure may provide the scenario setting GUI to the electronic device 160.

For example, when the electronic device 160 executes a particular application installed in the electronic device 160, the server device 110 may provide the scenario setting GUI to the electronic device 160 through the particular application. The particular application may be an application for providing a service related to the first group device 150 or the second group device 120.

In operation S1603, the electronic device 160 according to an embodiment of the present disclosure may display the scenario setting GUI.

According to an embodiment of the present disclosure, when the user executes a particular application installed in the electronic device 160, the electronic device 160 may display the scenario setting GUI on an execution window of the particular application.

In operation S1604, the electronic device 160 according to an embodiment of the present disclosure may receive an input for setting a third scenario through the scenario setting GUI.

For example, the electronic device 160 may select third environment information from the environment information list through the scenario setting GUI, select the first group device 150 or the second group device 120 from the control target device list, and receive an input for selecting a certain operation in the operation list from the user. In this case, the third scenario may be defined by matching the third environment information selected by the user to an operation of the first group device 150 or the second group device 120.

In operation S1605, the electronic device 160 according to an embodiment of the present disclosure may transmit an input for setting the third scenario to the server device 110.

The server device 110 according to an embodiment of the present disclosure may receive an input for setting the third scenario related to the third environment information through the electronic device 160. For example, the server device 110 may receive an input for setting the third scenario through a particular application executed in the electronic device 160.

According to an embodiment of the present disclosure, when the user selects the third environment information from the environment information list, selects the first group device 150 or the second group device 120 from the control target device list, and selects a certain operation from the operation list, the server device 110 may define the third scenario in which the third environment information selected by the user is matched to an operation of the first group device 150 or the second group device 120.

In operation S1606, the server device 110 according to an embodiment of the present disclosure may add the third scenario to the scenario list 233.

Thereafter, the server device 110 may control the first group device 150 or the second group device 120 according to the third scenario when the third environment information related to the third scenario is received.

According to an embodiment of the present disclosure, by providing the scenario setting GUI to the user, the server device 110 may allow the user to directly define a necessary scenario. Hereinafter, an operation of the server device 110 providing the scenario setting GUI will be described in more detail with reference to FIG. 17.

Figure 17:
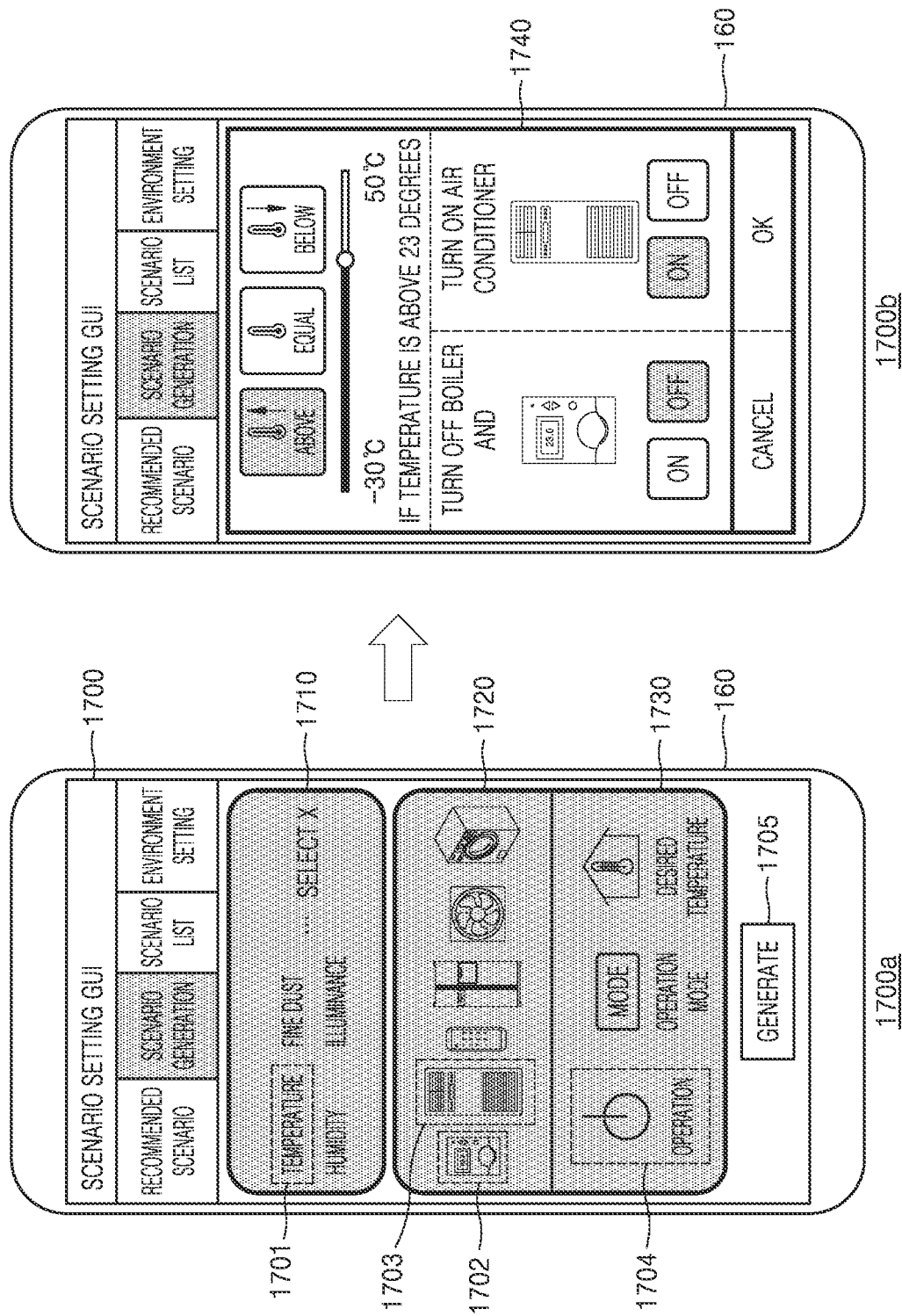
FIG. 17 is a diagram for describing an operation of a server device receiving scenario setting from the user through a scenario setting GUI, according to an embodiment of the present disclosure.

FIG. 17 is a diagram for describing an operation of a server device receiving scenario setting from the user through a scenario setting GUI, according to an embodiment of the present disclosure.

Referring to 1700a of FIG. 17, a scenario setting GUI 1700 may include an environment information list 1710 that is a condition list, a control target device list 1720, and an operation list 1730.

The environment information list 1710 may include at least one environment condition candidate selectable by the user. The environment condition candidate may correspond to environment conditions collectable by the server device 110.

The control target device list 1720 may be a list of home appliances to be controlled when the environment condition is satisfied. The control target device list 1720 according to an embodiment of the present disclosure may include the second group device 120 and the first group device 150 registered through the operation registration GUI. The control target device list 1720 according to an embodiment of the present disclosure may include the names, nicknames, and icon images of the home appliances.

The operation list 1730 may be a list related to an operation of the second group device 120 registered in the account of the server device 110 and an operation of the first group device 150 with an operation-related instruction packet registered in the server device 110. For example, when an air conditioner item 1703 is selected from the control target device list 1720, the operation list of the air conditioner item 1703 may include operations (turn on, turn off, and the like), operation modes (comfort mode, cooling mode, dehumidifying mode, cleaning mode, and the like), desired temperature setting, and/or the like; however, the present disclosure is not limited thereto.

The electronic device 160 may receive a user input for selecting one of the environment condition candidates from the environment information list 1710 through the scenario setting GUI 1700. For example, the user may select a temperature item 1701 among the environment condition candidates.

Next, the electronic device 160 may select at least one home appliance to be controlled from the control target device list 1720 when the environment condition is satisfied and may receive a user input for selecting an operation of the selected home appliance from the operation list 1730. For example, the user may select a boiler item 1702 and an air conditioner item 1703 from the control target device list 1720 and select an operation item 1704 from the operation list 1730.

Also, when the electronic device 160 receives an input of touching a generation icon 1705 at the bottom of the scenario setting GUI 1700, the electronic device 160 may display a detailed setting GUI 1740 for setting a detailed scenario, in a pop-up form on the scenario setting GUI 1700.

Referring to 1700b of FIG. 17, the electronic device 160 may receive a user input for setting a detailed scenario, through the detailed setting GUI 1740. For example, the user may set the temperature to 23° C. in the detailed setting GUI 1740, select the power of the boiler as 'OFF', and select the power of the air conditioner as 'ON'. In this case, a scenario 'when the temperature is above 23° C., turn off the boiler and turn on the air conditioner' may be newly generated. The server device 110 may add the newly generated scenario ('when the temperature is above 23° C., turn off the boiler and turn on the air conditioner') to the scenario list 233.

Thereafter, based on the environment information obtained from the first group device 150 or the second group device 120, the server device 110 may monitor the indoor temperature and detect a control command 'turn off the boiler and turn on the air conditioner' based on the scenario when the indoor temperature is above 23° C. Also, the server device 110 may transmit the detected control command ('turn off the boiler and turn on the air conditioner') to each of the boiler and the air conditioner. In this case, the boiler may be turned off according to the control command and the air conditioner may be turned on according to the control command.

Figure 18:
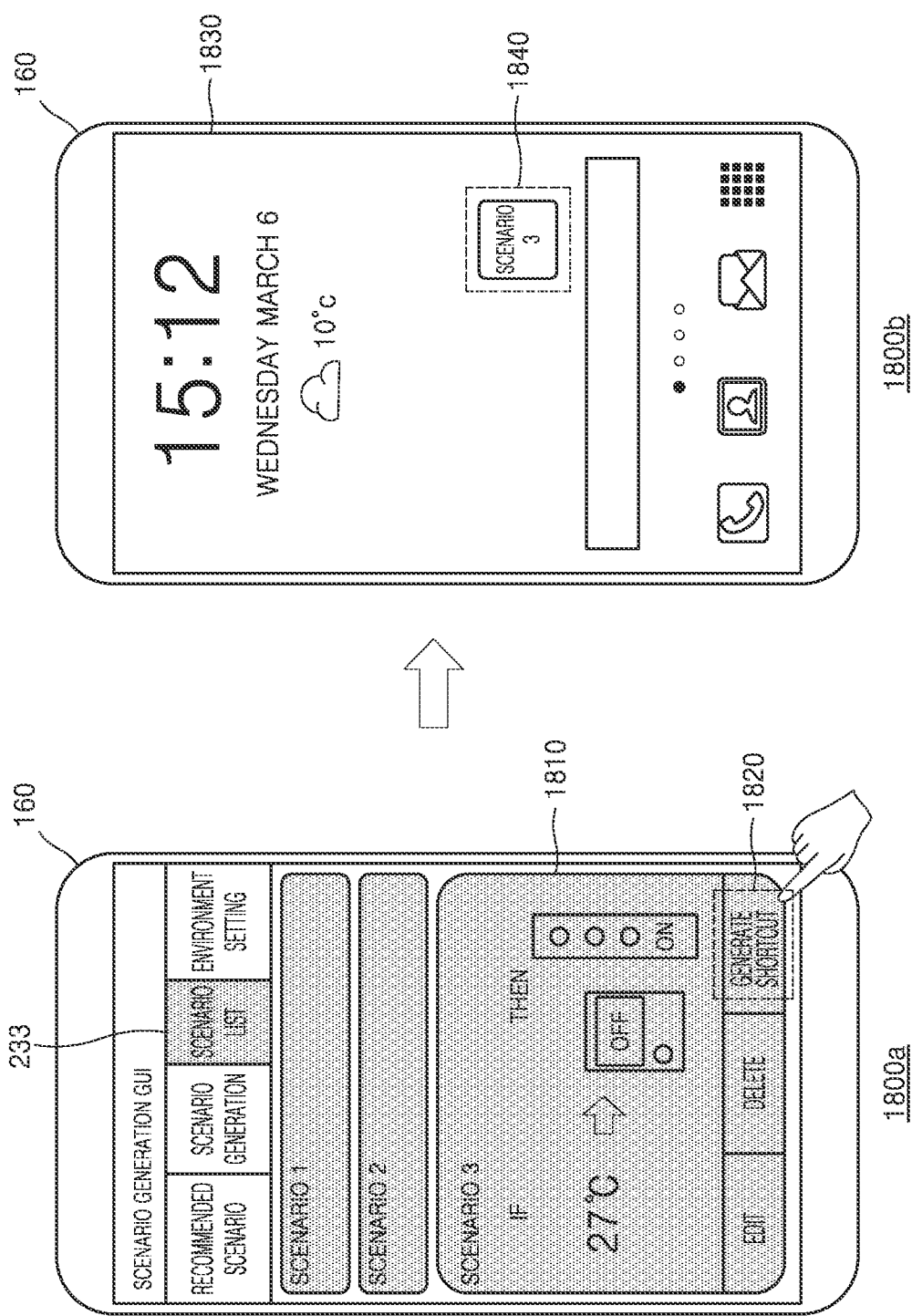
FIG. 18 is a diagram for describing an operation of a server device providing a shortcut icon for a particular scenario, according to an embodiment of the present disclosure.

FIG. 18 is a diagram for describing an operation of a server device providing a shortcut icon for a particular scenario, according to an embodiment of the present disclosure.

Referring to FIG. 18, by receiving a user input of touching a shortcut generation icon 1820 at the bottom of a scenario 3 1810 included in the scenario list 233, the electronic device 160 may generate a shortcut icon 1840 corresponding to the scenario 3 1810 on a home screen 1830 of the electronic device 160. Here, the home screen 1830 may not refer to a screen of a particular application but may refer to a screen displaying an application list. Alternatively, the home screen 1830 may be a screen that is directly connected when an external home button of the electronic device 160 is clicked.

According to an embodiment of the present disclosure, when the electronic device 160 receives a user input of touching the shortcut icon 1840 displayed on the home screen 1830 of the electronic device 160, it may control an operation of the home appliance included in the scenario regardless of whether the environment condition included in the scenario is satisfied. For example, when the user touches the shortcut icon 1840 corresponding to the scenario 3 1810 generated on the home screen 1830 of the electronic device 160, an operation of turning off the boiler and turning on the air conditioner may be immediately executed even when an indoor temperature of 27 degrees in Celsius (C°) is not satisfied.

According to an embodiment of the present disclosure, the user may generate a scenario related to an operation of a frequently-used home appliance in the form of the shortcut icon 1840. Accordingly, the user may immediately control an operation of the home appliance by touching the shortcut icon 1840 displayed on the home screen 1830 of the electronic device 160.

The method according to an embodiment of the present disclosure may be embodied in the form of program commands executable through various computer means, which may be recorded on a computer-readable recording medium. The computer-readable recording medium may include program commands, data files, and data structures either alone or in combination. The program commands recorded on the computer-readable recording medium may be those that are especially designed and configured for the present disclosure, or may be those that are known and available to those of ordinary skill in computer software. Examples of the computer-readable recording medium include magnetic media such as hard disks, floppy disks, or magnetic tapes, optical media such as CD-ROMs or DVDs, and magneto-optical media such as floptical disks, and hardware devices such ROMs, RAMs, or flash memories specially configured to store and execute program commands. Examples of the program commands include machine language codes that may be generated by a compiler, and high-level language codes that may be executed by a computer by using an interpreter.

Some embodiments of the present disclosure may also be implemented in the form of computer-readable recording mediums including instructions executable by computers, such as program modules executed by computers. The computer-readable recording mediums may be any available mediums accessible by computers and may include both volatile and non-volatile mediums and detachable and non-detachable mediums. Also, the computer-readable recording mediums may include computer storage mediums and communication mediums. The computer storage mediums may include both volatile and non-volatile and detachable and non-detachable mediums implemented by any method or technology for storage of information such as computer-readable instructions, data structures, program modules, or other data. The communication mediums may include any information transmission medium and may include other transmission mechanisms or other data of modulated data signals such as computer-readable instructions, data structures, program modules, or carriers. Also, some embodiments of the present disclosure may be implemented as computer programs or computer program products including instructions executable by computers, such as computer programs executed by computers.

The machine-readable storage medium may be provided in the form of a non-transitory storage medium. Here, the term "non-transitory storage medium" may mean that the storage medium is a tangible device and does not include signals (e.g., electromagnetic waves), and may mean that data may be semipermanently or temporarily stored in the storage medium. For example, the "non-transitory storage medium" may include a buffer in which data is temporarily stored.

Also, the method according to an embodiment of the present disclosure may be included and provided in a computer program product. The computer program product may be traded as a product between a seller and a buyer. The computer program product may be distributed in the form of a machine-readable storage medium (e.g., a compact disc read only memory (CD-ROM)) or may be distributed (e.g., downloaded or uploaded) online through an application store (e.g., Play Store™) or directly between two user devices. In the case of online distribution, at least a portion of the computer program product (e.g., a downloadable app) may be at least temporarily stored or temporarily generated in a machine-readable storage medium such as a memory of a manufacturer server, a memory of an application store server, or a memory of a relay server.

Although embodiments of the present disclosure have been described above in detail, the scope of the present disclosure is not limited thereto and various modifications and improvements made by those of ordinary skill in the art by using the basic concept of the present disclosure defined in the following claims are also included in the scope of the present disclosure.

What is claimed is:

1. A method by which a server device controls a home appliance, the method comprising:
    receiving a first instruction packet of a first group device, which is connected to a home network hub device and controlled by the first instruction packet broadcast from the home network hub device, from a relay device connected to the home network hub device;
    storing in the server device the first instruction packet;
    identifying, based on first environment information obtained from the first group device or a second group device, a first scenario corresponding to the first environment information among a scenario list defining at least one operation of at least one of the first group device or the second group device;
    identifying, based on the first scenario, the first instruction packet for controlling an operation of the first group device and a second instruction packet for controlling an operation of the second group device; and
    transmitting the first instruction packet to the relay device connected to the home network hub device and transmitting the second instruction packet to the second group device.

2. The method of claim 1, wherein the first instruction packet comprises first identification information comprising destination information for transmission to the relay device, and
    the second instruction packet comprises second identification information comprising destination information for transmission to the second group device.

3. The method of claim 1, wherein the first instruction packet is transmitted from the relay device to the home network hub device and is broadcast from the home network hub device to the first group device.

4. The method of claim 1, wherein the storing of the first instruction packet of the first group device comprises:
    providing, to an electronic device communicating with the server device, a graphical user interface (GUI) for guiding registration of operation of the first group device;
    receiving an instruction packet, through the relay device, which is broadcast from the home network hub device to the relay device, based on an operation of the first group device corresponding to the GUI; and
    matching the received instruction packet and the operation of the first group device and storing the matched information in a lookup table of the server device, wherein storing the received instruction as the first instruction packet.

5. The method of claim 1, further comprising:
    obtaining at least one piece of environment information from the first group device or the second group device;
    providing, to an electronic device, a plurality of recommended scenarios in which the obtained at least one piece of environment information is matched to the at least one operation of at least one of the first group device or the second group device; and
    adding a second scenario to the scenario list based on receiving an input for selecting the second scenario related to second environment information among the plurality of recommended scenarios through the electronic device.

6. A server device comprising:
    a communication interface configured to communicate with at least one home appliance;
    at least one processor; and
    a memory storing one or more instructions that, when executed by the at least one processor, cause the server device to perform:
        an operation of receiving a first instruction packet of a first group device, which is connected to a home network hub device and controlled by the first instruction packet broadcast from the home network hub device, from a relay device connected to the home network hub device;
        an operation of storing the first instruction packet;
        an operation of identifying, based on first environment information obtained from the first group device or a second group device, a first scenario corresponding to the first environment information among a scenario list defining at least one operation of at least one of the first group device or the second group device;
        an operation of identifying, based on the first scenario, at least one of the first instruction packet for controlling an operation of the first group device or a second instruction packet for controlling an operation of the second group device; and
        an operation of transmitting the first instruction packet to the relay device connected to the home network hub device and transmitting the second instruction packet to the second group device,
    wherein the at least one home appliance includes at least one of the second group device or the relay device.

7. The server device of claim 6, wherein the first instruction packet comprises first identification information comprising destination information for transmission to the relay device, and
    the second instruction packet comprises second identification information comprising destination information for transmission to the second group device.

8. The server device of claim 6, wherein the first instruction packet is transmitted from the relay device to the home network hub device and is broadcast from the home network hub device to the first group device.

9. The server device of claim 6, wherein the one or more instructions, when executed by the at least one processor, cause the server device to perform:
    an operation of providing, to an electronic device communicating with the server device, a graphical user interface (GUI) for guiding registration of operation of the first group device;
    an operation of receiving an instruction packet, through the relay device, which is broadcast from the home network hub device to the relay device, based on an operation of the first group device corresponding to the GUI; and
    an operation of matching the received instruction packet and the operation of the first group device and storing the matched information in a lookup table of the server device,
    wherein storing the received instruction packet as the first instruction packet.

10. The server device of claim 6, wherein the one or more instructions, when executed by the at least one processor, cause the server device to perform:

an operation of obtaining at least one piece of environment information from the first group device or the second group device;

an operation of providing, to an electronic device, a plurality of recommended scenarios in which the obtained at least one piece of environment information is matched to the at least one operation of at least one of the first group device or the second group device; and an operation of adding a second scenario to the scenario list based on receiving an input for selecting the second scenario related to second environment information among the plurality of recommended scenarios through the electronic device.

11. A relay device comprising:

a first standard communication interface configured to communicate with a home network hub device;

a second standard communication interface configured to communicate with a server device;

at least one processor; and a memory storing one or more instructions that, when executed by the at least one processor, cause the relay device to perform:

an operation of receiving a first instruction packet for controlling an operation of a first group device, which is broadcast from the home network hub device, through the first standard communication interface, an operation of transmitting the received first instruction packet from the home network hub device to the server device through the second standard communication interface to store the first instruction packet in the server device, an operation of receiving the first instruction packet from the server device through the second standard communication interface, and an operation of transmitting the received first instruction packet from the server device to the home network hub device through the first standard communication interface.

12. A non-transitory computer-readable recording medium having recorded thereon a computer program for performing the method of any one of claims 1 to 5 in a computer.

* * * * *